(12) United States Patent
Crozier et al.

(10) Patent No.: US 12,496,884 B2
(45) Date of Patent: Dec. 16, 2025

(54) VEHICLE DOOR

(71) Applicant: SOFTCAR SA, Fribourg (CH)

(72) Inventors: Etienne Crozier, La Neuveville (CH);
Clara Gulli, Le Landeron (CH);
Guillaume Heisel, Bienne (CH);
Stéphane Landwerlin, Le Landeron (CH); Jean-Luc Thuliez, Le Landeron (CH)

(73) Assignee: SOFTCAR SA, Fribourg (CH)

( * ) Notice: Subject to any disclaimer, the term of this patent is extended or adjusted under 35 U.S.C. 154(b) by 0 days.

(21) Appl. No.: 18/576,545

(22) PCT Filed: Jul. 5, 2022

(86) PCT No.: PCT/IB2022/056213
§ 371 (c)(1),
(2) Date: Jan. 4, 2024

(87) PCT Pub. No.: WO2023/281396
PCT Pub. Date: Jan. 12, 2023

(65) Prior Publication Data
US 2024/0326565 A1 Oct. 3, 2024

(30) Foreign Application Priority Data
Jul. 5, 2021 (WO) .................. PCT/IB2021/056012

(51) Int. Cl.
*B60J 5/04* (2006.01)
(52) U.S. Cl.
CPC .................. *B60J 5/0473* (2013.01)
(58) Field of Classification Search
CPC .................................................... B60J 5/0473
See application file for complete search history.

(56) References Cited

U.S. PATENT DOCUMENTS 2,903,296 A * 9/1959 Barenyi ................. B60J 5/0473
16/365
3,511,530 A * 5/1970 Barenyi ................. B60J 5/0473
49/386
(Continued)

FOREIGN PATENT DOCUMENTS

DE 9219189 U1 * 8/1999 ............ B60J 5/0473
DE 10301584 B4 4/2006
(Continued)

OTHER PUBLICATIONS

International Search Report w/English translation for PCT/IB2022/056213 mailed Feb. 6, 2023, 9 pages.
(Continued)

*Primary Examiner* — Catherine A Kelly
(74) *Attorney, Agent, or Firm* — NIXON & VANDERHYE

(57) ABSTRACT

The invention relates to a sectional door of a vehicle opening as close as possible to the body of said vehicle, having cam strikers for closing, locking and opening same, having actuators for opening same and having a movable window capable of separating from said body and translating horizontally along said door. These elements are implemented on a door having surfaces with a complex geometry, thus providing a one-piece body having surfaces with a complex geometry, with a single large opening on the side for accessing the front seats and the rear seats, and a single large door for closing said opening.

24 Claims, 37 Drawing Sheets

(56) References Cited

U.S. PATENT DOCUMENTS

| | | | | |
|---|---|---|---|---|
| 4,684,167 | A * | 8/1987 | Newmayer | B60J 5/0473 |
| | | | | 16/382 |
| 4,982,984 | A * | 1/1991 | Yokota | E05B 81/22 |
| | | | | 292/201 |
| 5,013,082 | A * | 5/1991 | Landmesser | B60J 5/0473 |
| | | | | 296/202 |
| 5,722,114 | A * | 3/1998 | Lapp, Jr. | E05F 1/1008 |
| | | | | 16/61 |
| 5,992,918 | A * | 11/1999 | Gobart | B60J 5/0473 |
| | | | | 296/146.13 |
| 6,068,327 | A * | 5/2000 | Junginger | E05F 1/1091 |
| | | | | 296/146.13 |
| 6,454,341 | B2 * | 9/2002 | Tolinski | B60J 5/104 |
| | | | | 296/106 |
| 7,059,654 | B2 * | 6/2006 | Ichinose | E05B 81/22 |
| | | | | 296/202 |
| 7,627,986 | B2 * | 12/2009 | Hirai | E05B 81/22 |
| | | | | 49/280 |
| 8,449,015 | B2 * | 5/2013 | Brown | E05F 15/605 |
| | | | | 296/146.12 |
| 9,422,012 | B2 * | 8/2016 | Fischer | B60J 1/008 |
| 9,759,000 | B2 * | 9/2017 | Stuart | E05D 5/06 |
| 10,583,717 | B2 * | 3/2020 | Hoggarth | B60J 5/06 |
| 11,512,505 | B2 * | 11/2022 | Schwickerath | E05B 81/74 |
| 11,788,339 | B2 * | 10/2023 | Cho | E05D 5/062 |
| | | | | 296/146.12 |
| 12,018,517 | B2 * | 6/2024 | Rosales | E05B 81/42 |
| 12,196,013 | B2 * | 1/2025 | Doan | E05B 81/34 |
| 2018/0209210 | A1 * | 7/2018 | Arndt | B65G 69/28 |
| 2023/0068661 | A1 * | 3/2023 | Pohl | E05B 81/20 |

FOREIGN PATENT DOCUMENTS

| | | | | | |
|---|---|---|---|---|---|
| DE | 102015211065 | A1 * | 12/2016 | | |
| DE | 102019132138 | A1 * | 5/2021 | | A61G 3/061 |
| EP | 0857844 | B1 | 12/2002 | | |
| EP | 2583848 | B1 | 11/2017 | | |
| EP | 3446904 | B1 | 12/2020 | | |
| EP | 3744622 | A1 | 12/2020 | | |
| FR | 2731658 | A1 * | 9/1996 | | B60J 5/0473 |
| FR | 2807778 | A1 | 10/2001 | | |
| FR | 2833213 | A1 | 6/2003 | | |
| FR | 2972679 | A1 * | 9/2012 | | B60J 5/0473 |
| FR | 3075241 | A1 | 6/2019 | | |
| FR | 3102452 | A1 * | 4/2021 | | B60J 5/0473 |
| GB | 1020521 | A * | 2/1966 | | |
| WO | WO-2013157273 | A1 * | 10/2013 | | E05D 15/26 |
| WO | 2017053785 | A1 | 3/2017 | | |
| WO | 2017109726 | A1 | 6/2017 | | |
| WO | 2025012732 | A1 | 1/2025 | | |

OTHER PUBLICATIONS

Written Opinion of the ISA for PCT/IB2022/056213 mailed Feb. 6, 2023, 9 pages.

* cited by examiner

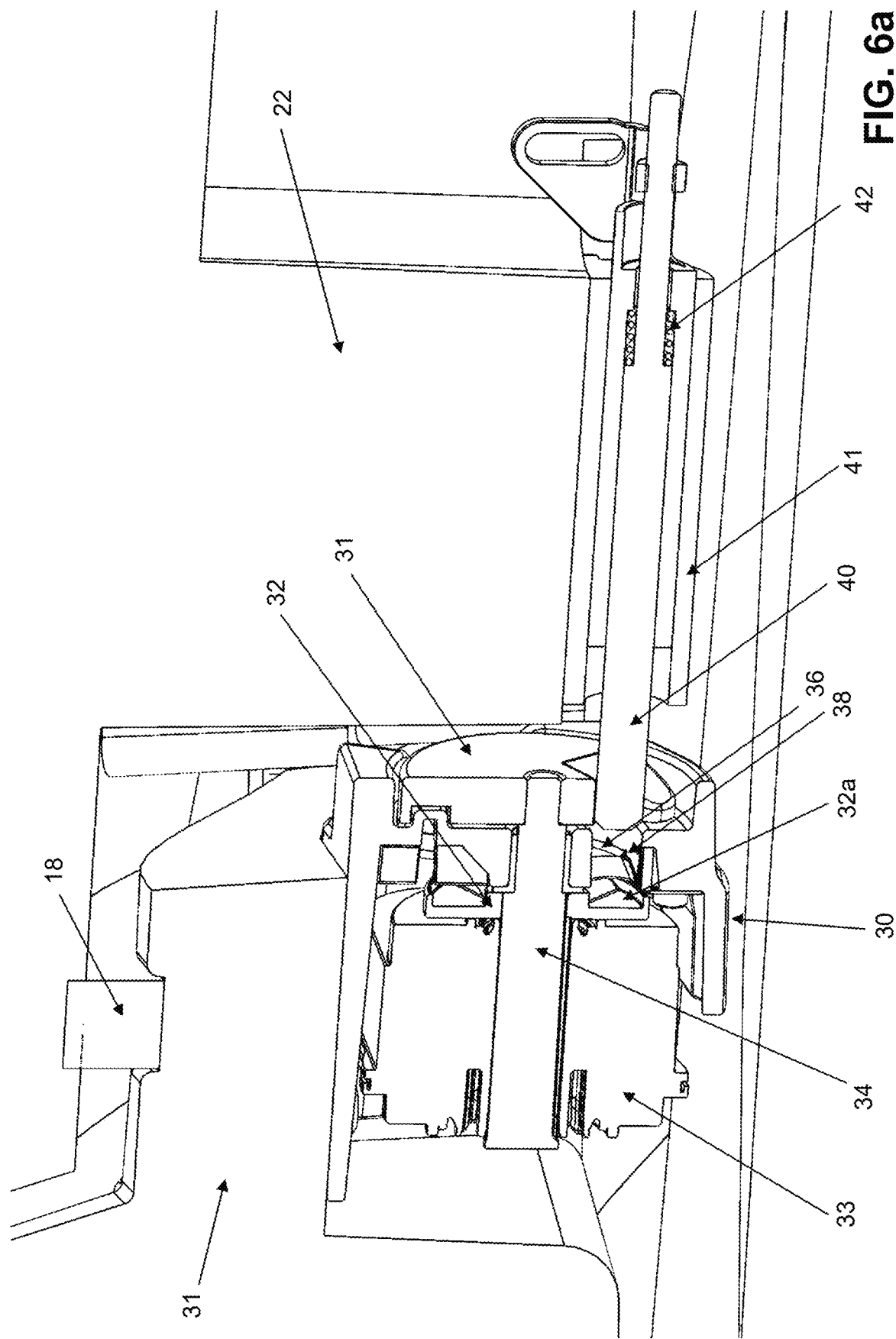

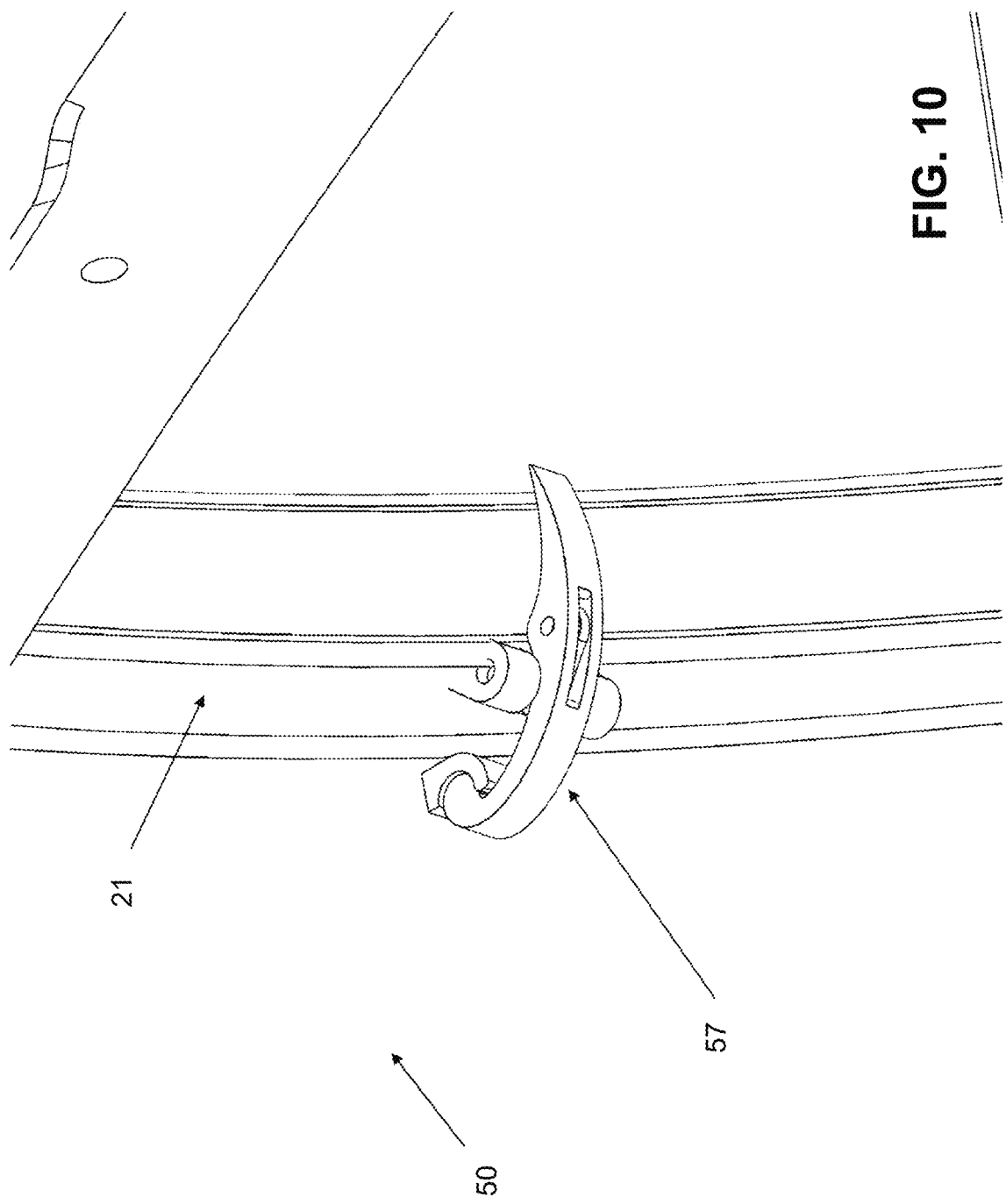

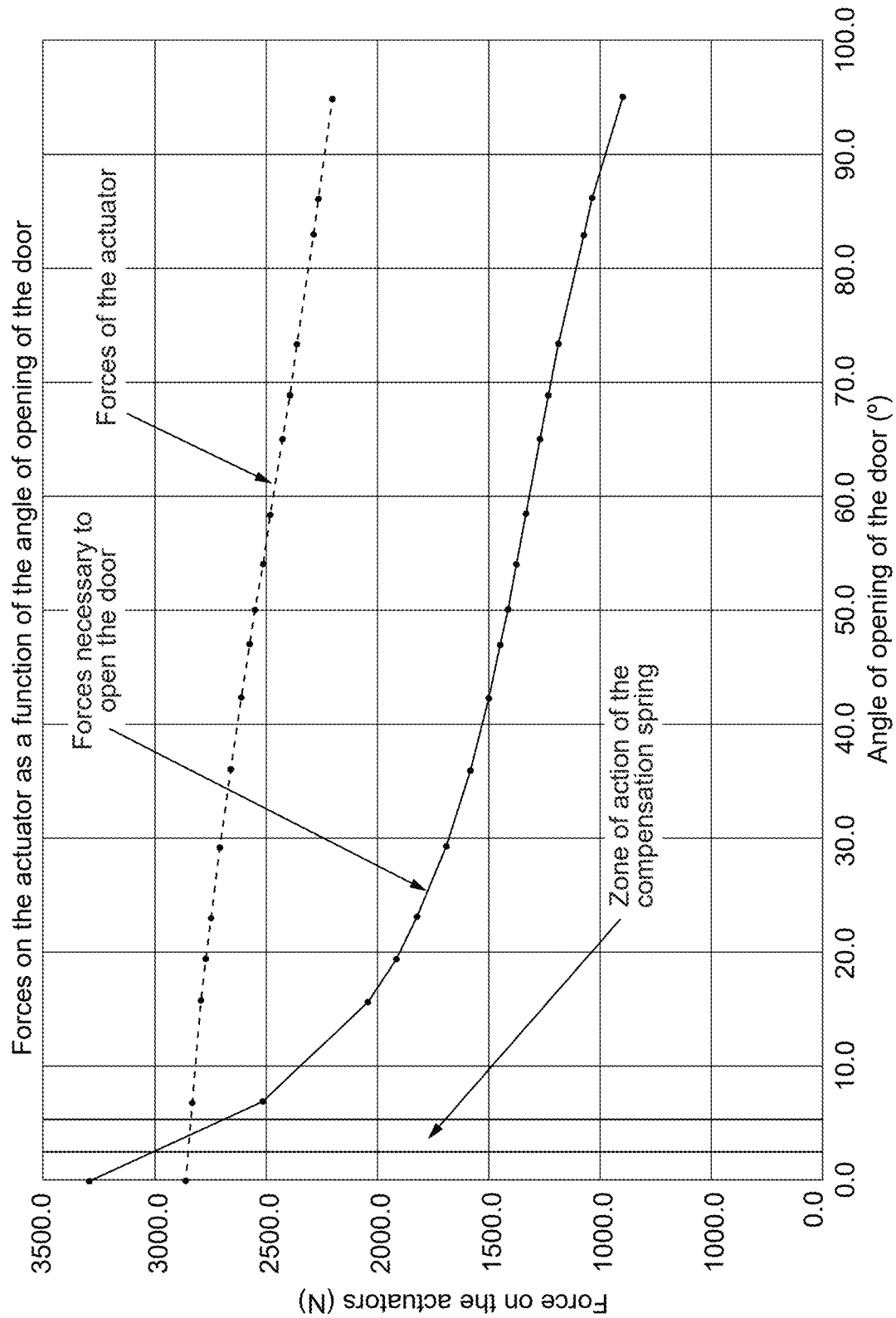

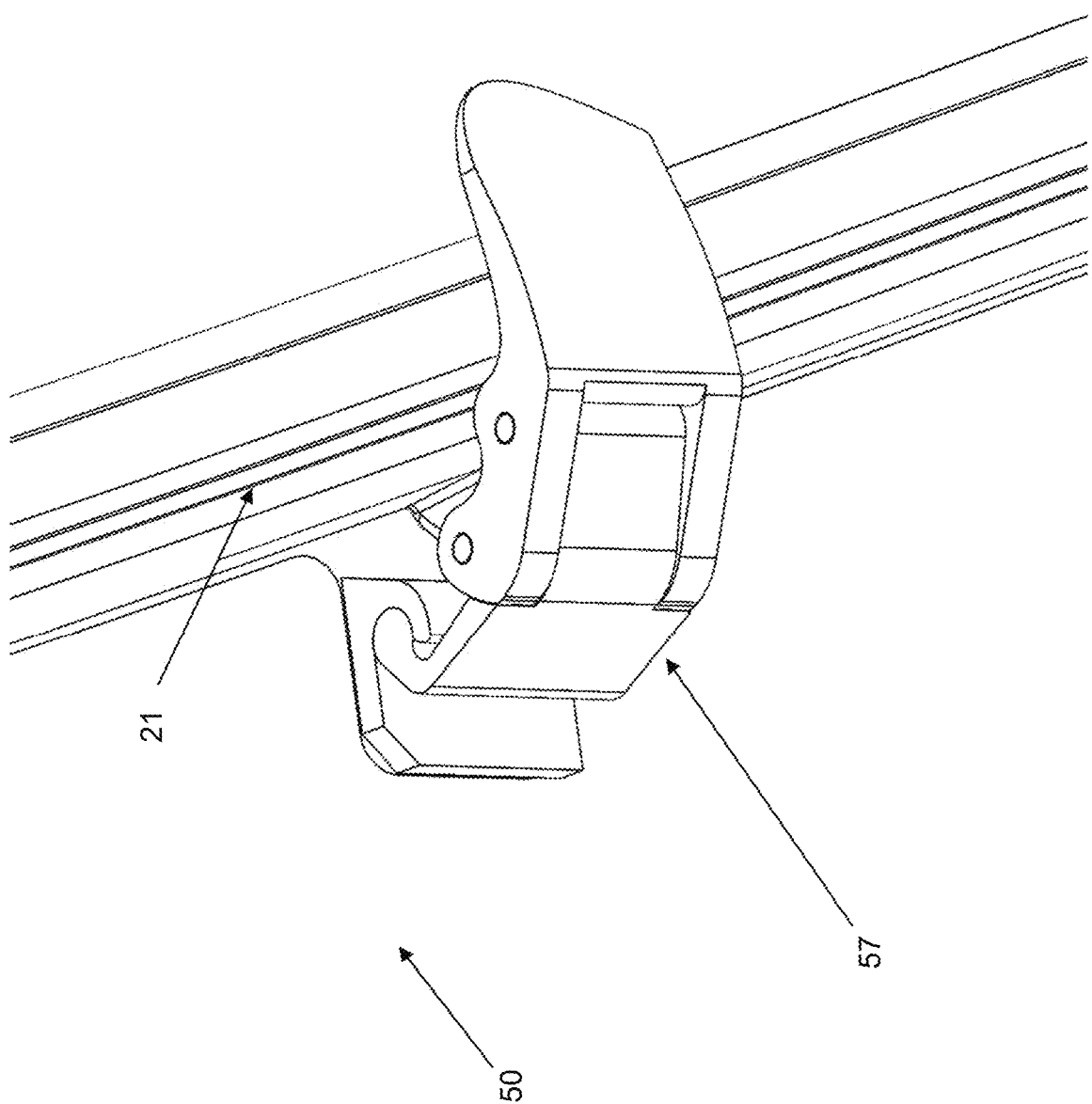

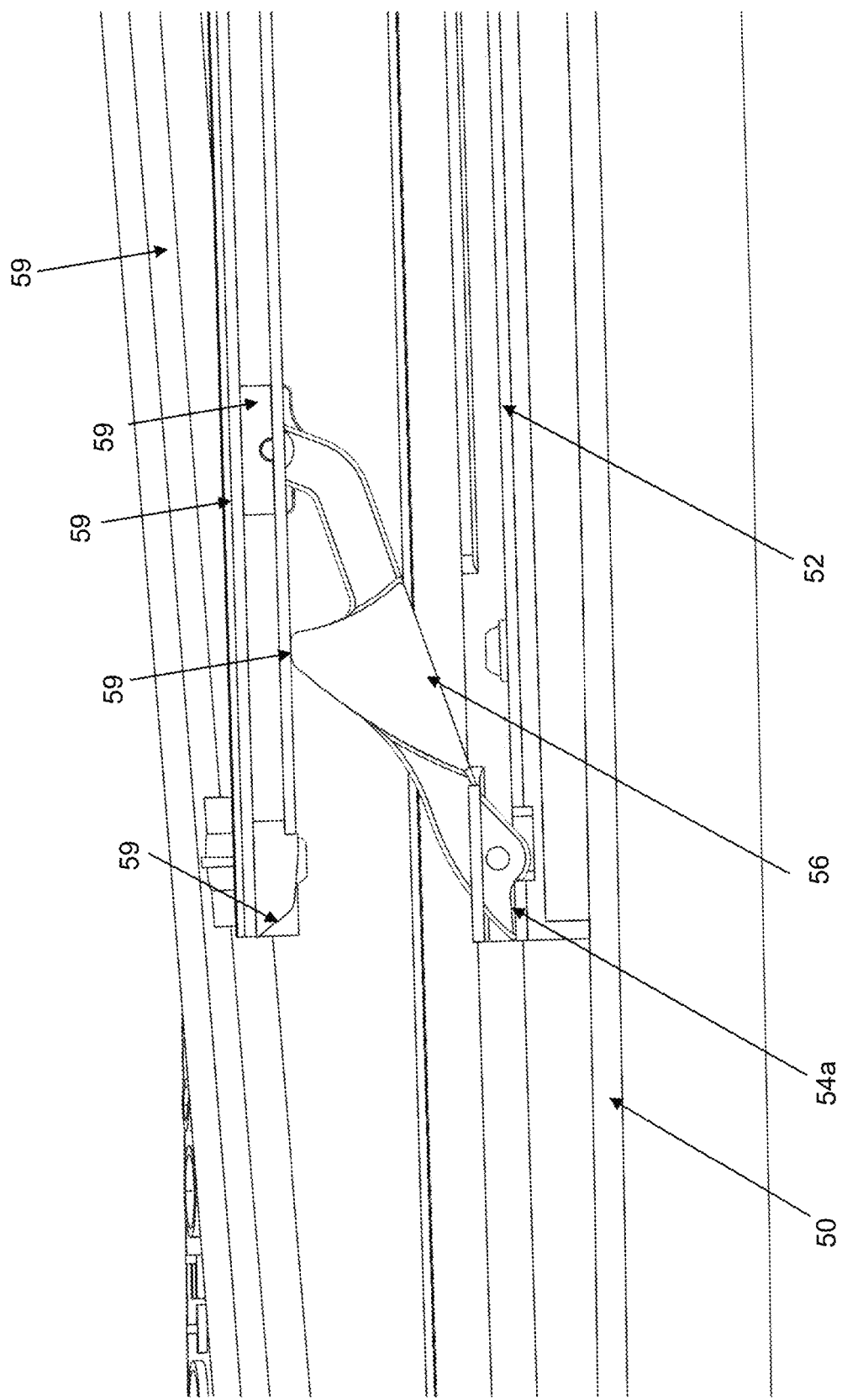

VEHICLE DOOR

CORRESPONDING APPLICATION

The present application is the U.S. national phase of International Application No. PCT/IB2022/056213 filed Jul. 5, 2022, which designated the U.S. and claims priority to the international application PCT/IB2021/056012 filed on Jul. 5, 2021 in the name of SOFTCAR SA, the contents of each of which being incorporated by reference in their entirety in the present application.

TECHNICAL FIELD

The present application relates to a vehicle door opening as close as possible to the body of said vehicle, means being associated to perform the opening, the closure and the locking thereof automatically and/or manually. Said door is further equipped with a movable window that can be detached from said body and translated along said door. These elements can be implemented on a door having surfaces with complex geometry, thus making it possible to have a one-piece body with significant curvatures, with a single large opening on the side for accessing the front and rear seats, and a single large door for closing said opening.

PRIOR ART

Motor vehicle doors are mostly produced in a single piece pivoting about a vertical axis. Because of this, when they are open, they significantly increase the width of the vehicle, and necessitate having space on the side of the vehicle. Closure is entirely manual and requires the door to be "slammed", which generates an overpressure in the interior, entailing the implementation of valves allowing the air to escape. In some cases, they have a motorized striker blocking a sliding bolt placed on the opening of the body, which requires electricity to be brought into the interior of the door.

In addition, the movable windows are placed in the upper part of the door and enter into the interior of the lower part upon opening. This means having to have windows with a regulated surface and doors which remain as a rigid piece.

Lateral sliding doors are known and require much less space on opening, but they require the presence of rails, which brings with it significant design constraints. Closure is entirely manual and requires the door to be "slammed", which generates an overpressure in the interior, entailing the implementation of valves allowing the air to escape. In some cases, they have a motorized striker blocking a sliding bolt placed on the opening of the body, which requires electricity to be brought into the interior of the door. Furthermore, the movable windows are placed in the upper part of the door and enter into the interior of the lower part upon opening. That means having to have windows with a regulated surface and doors which remain as a rigid piece.

Some vehicles are equipped with so-called "butterfly" doors which take up a lot of space laterally upon opening. They have the same features as the preceding doors regarding the closure and the windows.

There are, finally, winged doors which have the advantage of taking up very little space on opening and of not being "slammed" on closure, but they have a complex kinematic and an anchoring on the bodywork that has to withstand very significant forces.

In addition to the windows that slide vertically into the interior of the bottom part of the door, there are windows that can pivot about a vertical axis, but they take up space widthwise or have a limited opening.

There are also counter-type windows mounted on slide rails, but they do not offer freedom of design and rapidly become scratched.

SUMMARY OF THE INVENTION

One aim of the invention is first of all to enhance the known products and systems.

The present invention makes it possible to mitigate all of the above-mentioned drawbacks. It makes it possible, notably but not exclusively, to produce, for a body having surfaces with complex geometry (such as, for example, surfaces with spherical, toroidal, hybrid or other components, or surfaces with significant radii of curvature), a vehicle door that has a simple kinematic, that can be adapted to any body design, that opens as close as possible to the body, that closes without creating overpressure, that manages the closure and the locking without the addition of electricity in the door, and that makes it possible to have a movable door that opens widely regardless of its geometry and the form of the body. A door according to the invention is therefore on the one hand simple to produce and on the other hand very light.

This door can thus be installed on a one-piece body or produced in several parts. This body can have on one side two small openings (for example one to access the front seats and one to access the rear seats), or a single large opening making it possible to access all the seats (front and rear) and offering very great accessibility. Based on the number of openings, the body can thus be equipped with one or two doors per side, even more (for example one for each row of seats). The principle of the door according to the present invention is not limited to use on a side door but can be applied to a trunk lid for example.

The door is sectional, that is to say that it is composed of two kinematic groups. The first group is the top frame which pivots about a top axis, the orientation of which is substantially longitudinal (in the longitudinal direction illustrated in FIG. 1a) placed on the roof of the body. The second group is the bottom door leaf which pivots about a bottom axis, the orientation of which is also substantially longitudinal and placed on the top frame. When the door is closed, the top pivot being significantly further away transversely than vertically from the bottom pivot, the opening or the closure of the door is done along the form of the body, allowing the door to have a travel that exceeds the overall width of said vehicle by a value which is minimal, even zero. This makes it possible not to injure the user when the door is automatically opened. When the door is open, the height of the bottom door leaf is lower than the height of the top frame. Because of this, the bottom door leaf does not obstruct the opening and does not hamper the entering or exiting of the vehicle. There can be several parts for producing these pivots, but these parts are not very far apart longitudinally in order to be able to perform their function even if the body has a significant curvature.

When the vehicle is on a relatively horizontal surface, the bottom door leaves are positioned by gravity in their final closed position without outside assistance, because of the positioning of their center of gravity. However, for this function to be ensured even when the vehicle is on a slope in the transverse direction (see FIG. 1a), a spring can also be installed between the top frame and the bottom door leaf in order to bring the latter toward the interior of the vehicle.

The door preferably has three distinct positions: an open position, a semi-closed position, and a closed position. In the open position, the door does not cover the opening of the body, which allows the users to enter or exit the vehicle. In the semi-closed position, the opening of the body is obstructed by the door, but the seal-tightness is not yet produced between the inside and the outside of the interior of the vehicle. In the closed position, the seal-tightness is produced between the inside and the outside, and the door is ready to be locked in position. Between the closed position and the semi-closed position, the top frame preferably pivots by only a few degrees.

The door is provided with at least one sliding bolt and at least one detectable element, preferably two of each, one at the front and the other at the rear of the door. For each detectable element in the door, a sensor is installed in the body. For each sliding bolt in the door, a cam striker is installed in the body. Thus, upon the closure of the door, the latter is brought manually from the open position to the semi-closed position. In semi-closed position, the sensors detect the detectable elements of the door, triggering the rotation of cams in the cam strikers. These cams pull on the sliding bolts to bring the door toward the interior of the vehicle, until it reaches the closed position. This closure is thus done without "slamming" the door but by a controlled movement, not creating any overpressure in the interior.

In this step, the sliding bolt is guided in a groove of the cam striker. When the cam striker enters, this groove is substantially wider than the sliding bolt, in order for the sliding bolt to be able to enter into it even when the latter has a positioning defect. Similarly, the cam has geometries allowing it to be able to pull on the sliding bolt even if the latter is not perfectly well-positioned.

The door has a locking system to prevent it being opened from the outside. According to one embodiment, the motor or the transmission that makes the cam pivot has a non-reversible movement. The door is, de facto, locked in this closed position. Otherwise, according to another embodiment, the locking of the door is performed by the entry of the sliding bolt into a fixed cavity of the cam striker. The unlocking is, in this case, performed by a second cam pushing the sliding bolt out of this cavity.

In closed position, the bottom door leaf is blocked on a geometry of the body (for example by a door leaf-body fitting), producing a fourth anchor point of the door, in addition to the pivot on the roof, and the two sliding bolts blocked in the cam strikers. These four anchor points prevent the door from being torn away (vandalism, carjacking, theft) or from being indented (parking impact, vandalism, lateral crash). The curvature of the door, in case of indentation, makes it buttress on the edges of the opening, for a better hold in place.

Upon the opening of the door, the cam pivots in the reverse direction to that of closure, thus pushing the sliding bolt out of the cam striker, and therefore the door to the semi-closed position. This action can also be performed manually by acting on a handle, for example, which will pull on the sliding bolts to have them retracted out of the cam striker. In this case, it is the elasticity of the seals of the door which will push the door to its semi-closed position. Once in semi-closed position, actuators mounted between the body and the door (or other equivalent means) push the door to its open position, without the need for manual action on the part of the user. When the sensors no longer detect the presence of the detectable elements of the door, the cam striker returns the cam into a position in which it is ready to perform a new closure, if it is not already in this position (for example if the switch to the semi-closed position has been performed manually).

In the case of a non-reversible closure movement, the unlocking is done simply by having the cam pivot in the reverse direction to that of closure. A handle or a button can also be installed in the interior of the vehicle, manually pulling on this handle or pressing this button uncoupling the closure motor and the cam. In this configuration, there is no longer anything blocking the opening of the door. The elasticity of the seals and/or a manual action on the door makes it possible to push it from the closed position to the semi-closed position, the sliding bolt pushing the cam into its opening position, said cam no longer being blocked in rotation by the non-reversible motor or transmission.

For the opening, closing, locking and unlocking actions, the only electrified elements are the motor and the sensor. These elements are fixed onto the body. Thus there is no element requiring electricity present in the door, making it possible to avoid cost overheads, significant weights and failures. The operation of the opening-closure system of the door can be manual, partially or totally assisted (for example with actuators, springs, etc.), partially automated or entirely automated, the user simply giving a command (for example by pressing on a button or other equivalent such as manipulation of a handle of the door) for a part of the movement of the door or for the entire movement (opening and/or closure). The command can also be linked to the status of the vehicle (stopped in "parking" position, or switched on for a departure) and/or customizable with respect to said status. The command can also be given by a remote control, such as the key of the car, or by specific sensors, for example the detection of the physical position of the user (RFID, etc.).

With this type of door, the implementation of "standard" movable windows sliding inside the bottom door leaf is impossible since the bottom door leaf is movable with respect to the top frame. In addition, this type of window is not compatible with a body having surfaces with complex geometry. According to the invention, the movable window of the door is therefore opened by being slightly detached outward (semi-closed or semi-open position), then by translating toward the rear (open position).

To perform the translation, the system is provided with two rails: a fixed rail mounted on the door, and a movable rail mounted on the movable window. This makes it possible to have rails that are twice as short as in a system with a single rail, and to not see the rails when the window is in closed position. According to one embodiment, the fixed rail is positioned on the top frame of the door. According to another embodiment, the fixed rail is positioned on a fixed window.

A roller is guided in translation in each rail, and this roller is linked to the rest of the system by a connecting rod making it possible to detach the window from its closed position to its semi-closed position.

Stops are implemented to block the translation of the rollers into the closed position, to limit the detachment of the window, and to block the movement of the connecting rods between the semi-closed position and the open position. A locking system is also installed on the movable window in order to prevent it from being opened from the outside of the vehicle. The detachment of only the rear of the window is possible to allow a thread of air to pass into the rear of the interior.

The invention, its principles and embodiments are defined in the independent claims which follow the present description. Particular embodiments of the invention form the subject of the attached dependent claims.

BRIEF DESCRIPTION OF THE DRAWINGS

The present invention and its advantages will become more apparent from the following description of embodiments given as nonlimiting examples, with reference to the attached drawings, in which:

FIG. 6a represents a cross-sectional view of the cam striker and of the sliding bolt in closed position.

FIG. 10 represents a perspective view of the window locking system.

FIG. 12 represents a curve of the forces on the actuator as a function of the angle of opening of the door.

FIG. 16 represents a perspective view of the locking system of the window according to another embodiment.

FIG. 17c represents a detail view of an element of the movable window system, between the semi-closed position and the open position, according to another embodiment.

NUMERIC REFERENCES OF THE ELEMENTS

Figure 1A:
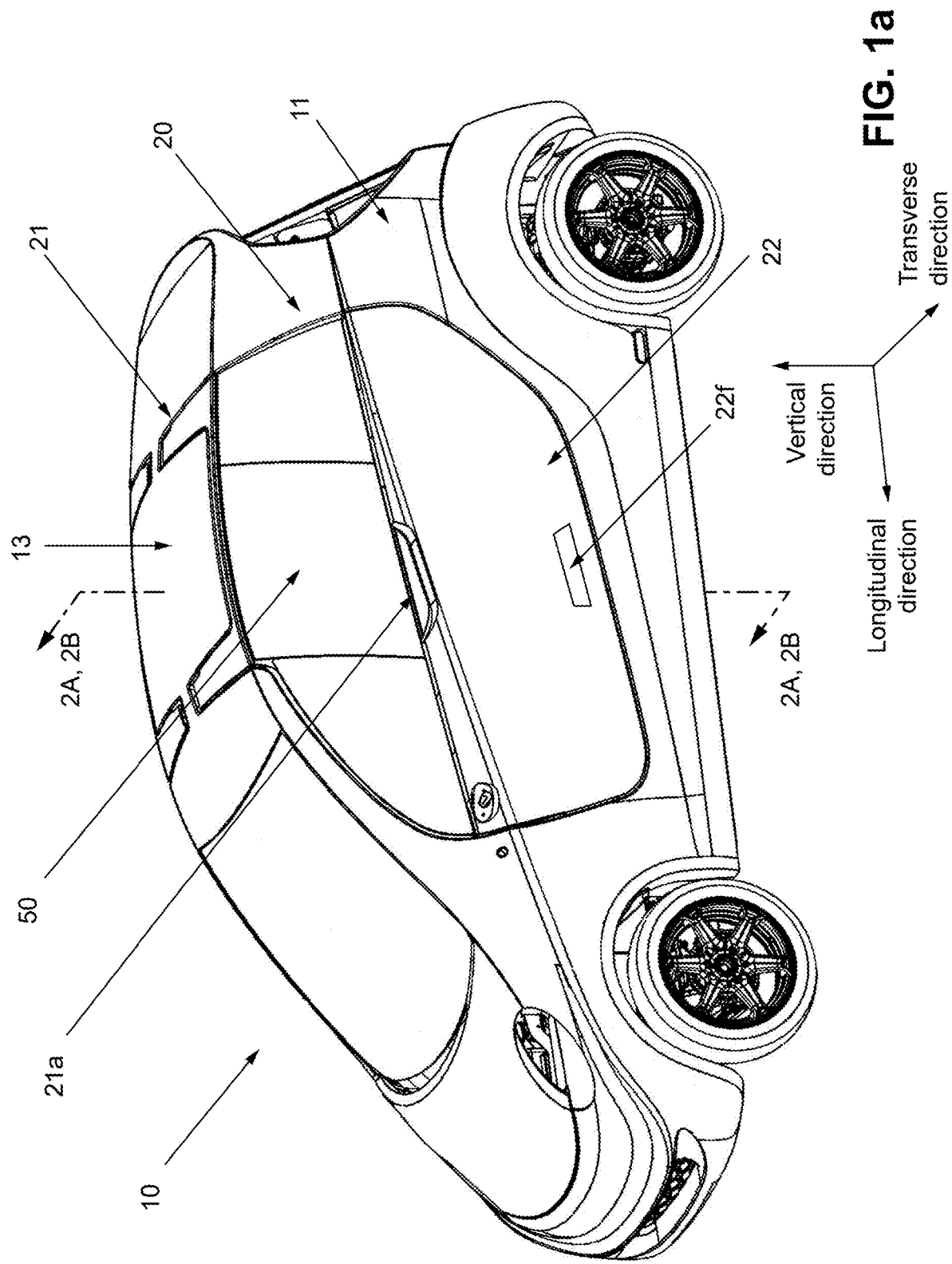
FIG. 1a represents a perspective view of the vehicle with the door closed.

10: vehicle
11: body
12: opening
12a: top of opening
13: roof
14: door leaf anchor
15: actuator
16: front seat
17: rear seat
18: door seal
20: door
21: top frame
21a: frame handle
22: bottom door leaf
22a: center of gravity of the door leaf
22b: door leaf opening stop
22c: door leaf closure stop
22d: bottom of the bottom door leaf
22e: armrest
22f: door leaf handle
23: top pivot
24: bottom pivot
25: detectable element
26: door leaf spring
27: grip strap
30: cam striker
31: closure cam
31a: closure cavity
31b: opening cavity
32: unlocking cam
32a: unlocking inclined plane
33: cam motor
34: cam axis
35: guiding groove
35a: guiding groove inlet
36: locking cavity
37: door sensor
38: sliding bolt sensor
40: sliding bolt
40a sliding bolt shoulder 41: sliding bolt recess
42: sliding bolts spring
43: handle
44 rod system
50: movable window
51: fixed rail
51a: fixed slide-rail stop
51b: fixed closure stop
52: movable rail
52a: movable slide-rail stop
52b: movable closure stop
53: fixed roller
53a: fixed opening stop
54: movable roller
54a: movable opening stop
55: fixed connecting rod
56: movable connecting rod
57: window locking system
58: window seal
59: opening slope
60: closure spring
61: hook
62: tongue
63: tongue spring

DETAILED DESCRIPTION OF EMBODIMENTS OF THE INVENTION

The invention is not limited to the embodiments or embodiments described, but can be modified by involving means equivalent to those described.

Figure 1B:
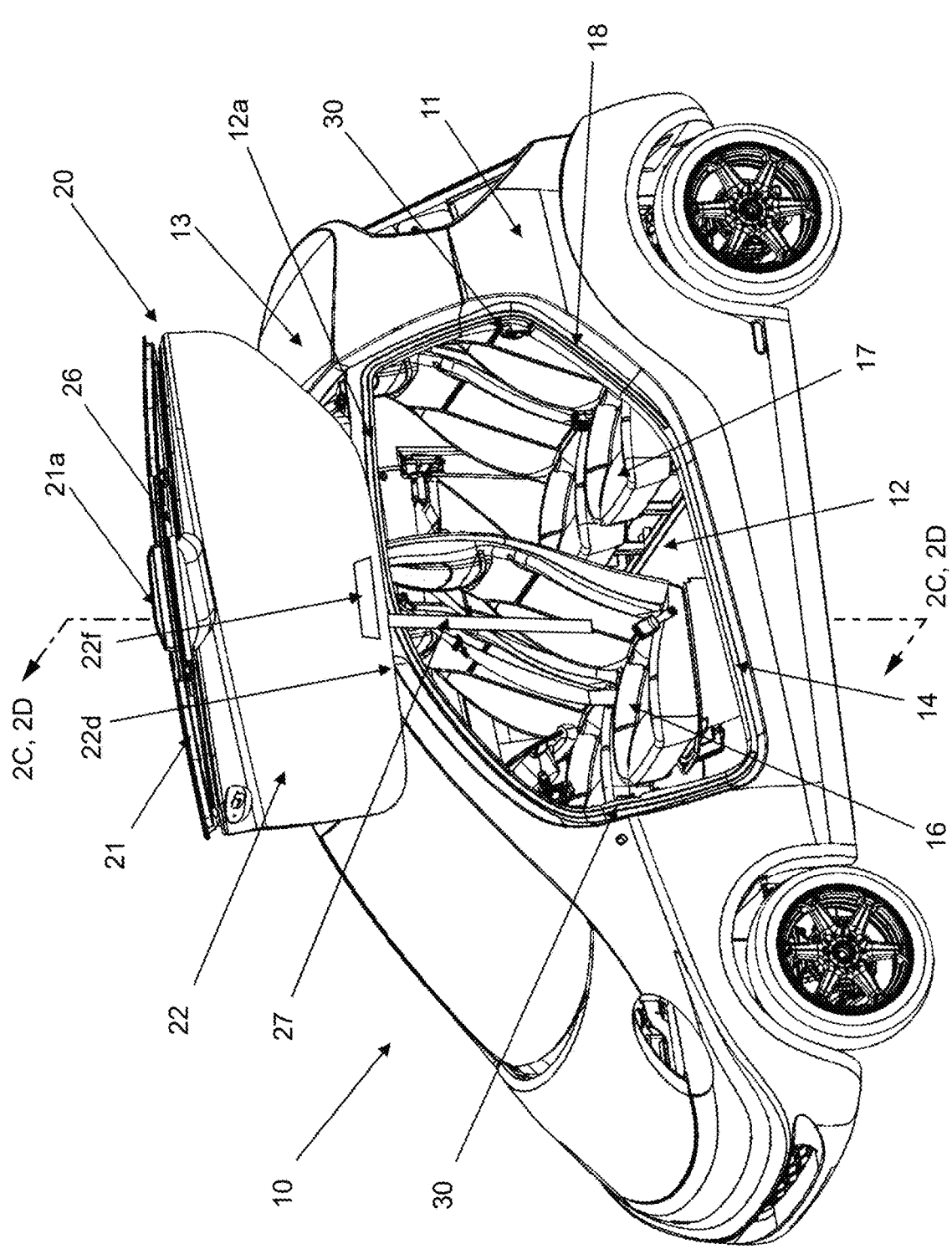
FIG. 1b represents a perspective view of the vehicle with the door open.
Figure 2A:
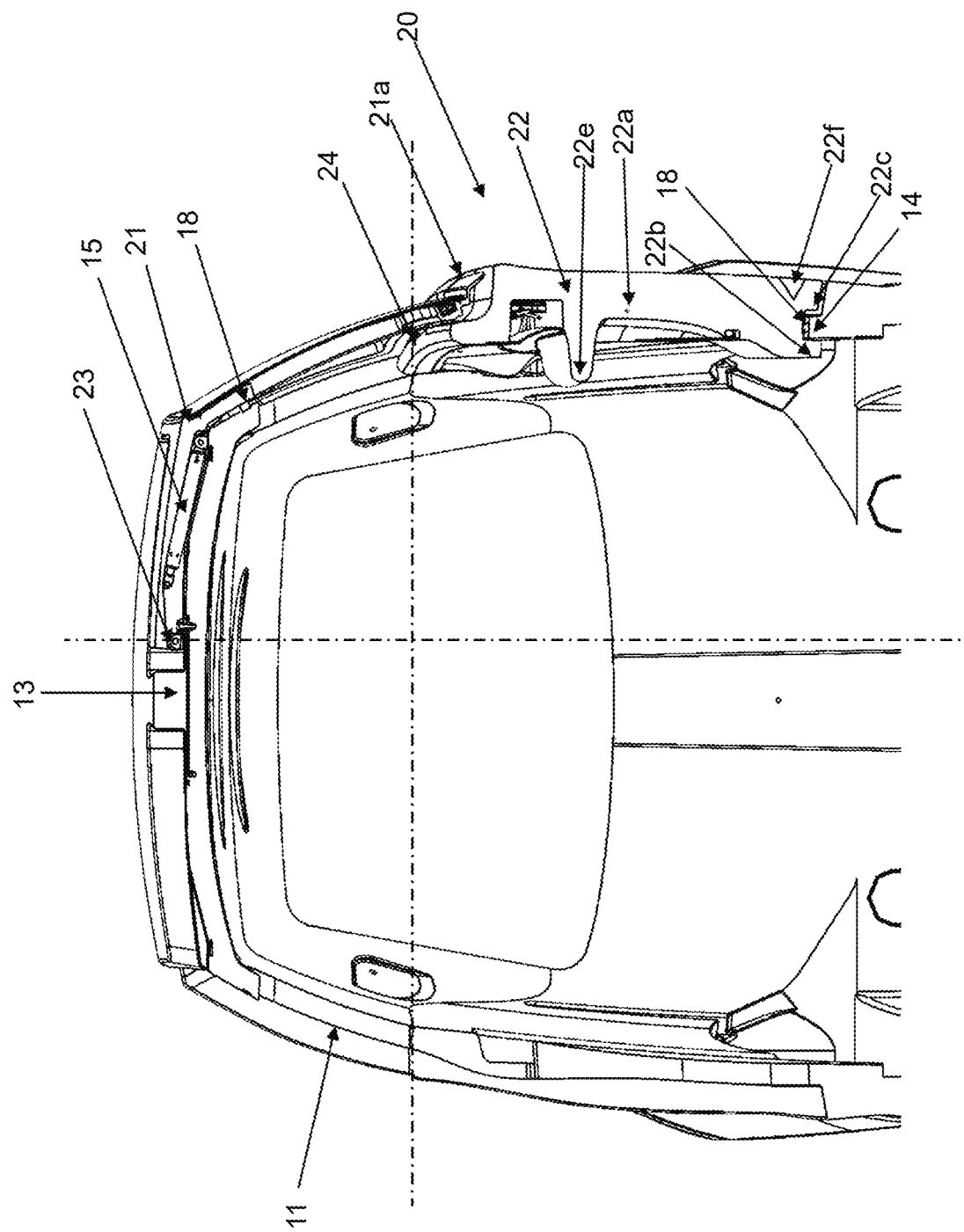
FIG. 2a represents a front view in cross-section of the vehicle with the door closed.
Figure 2B:
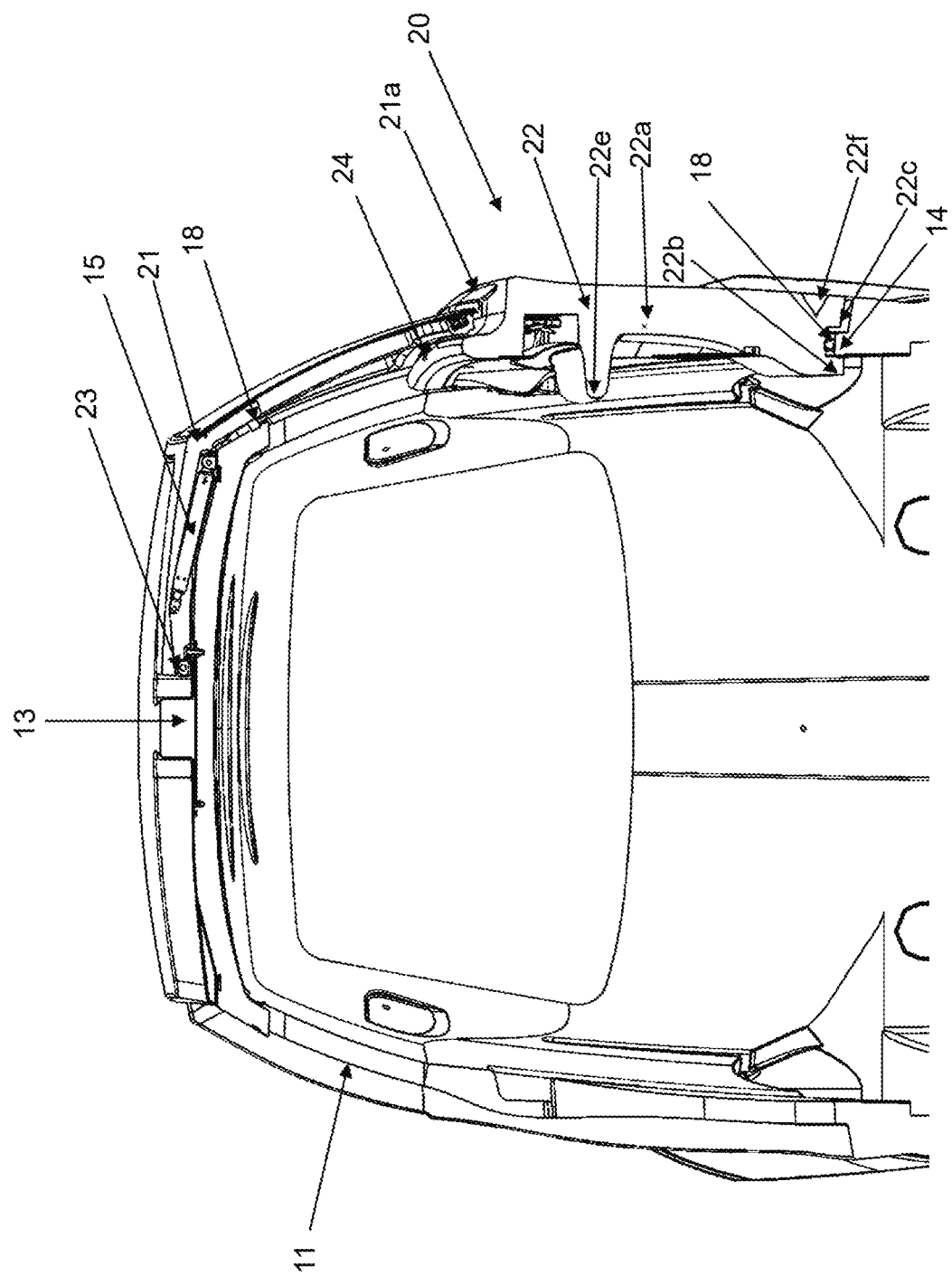
FIG. 2b represents a front view in cross-section of the vehicle with the door semi-closed.
Figure 2C:
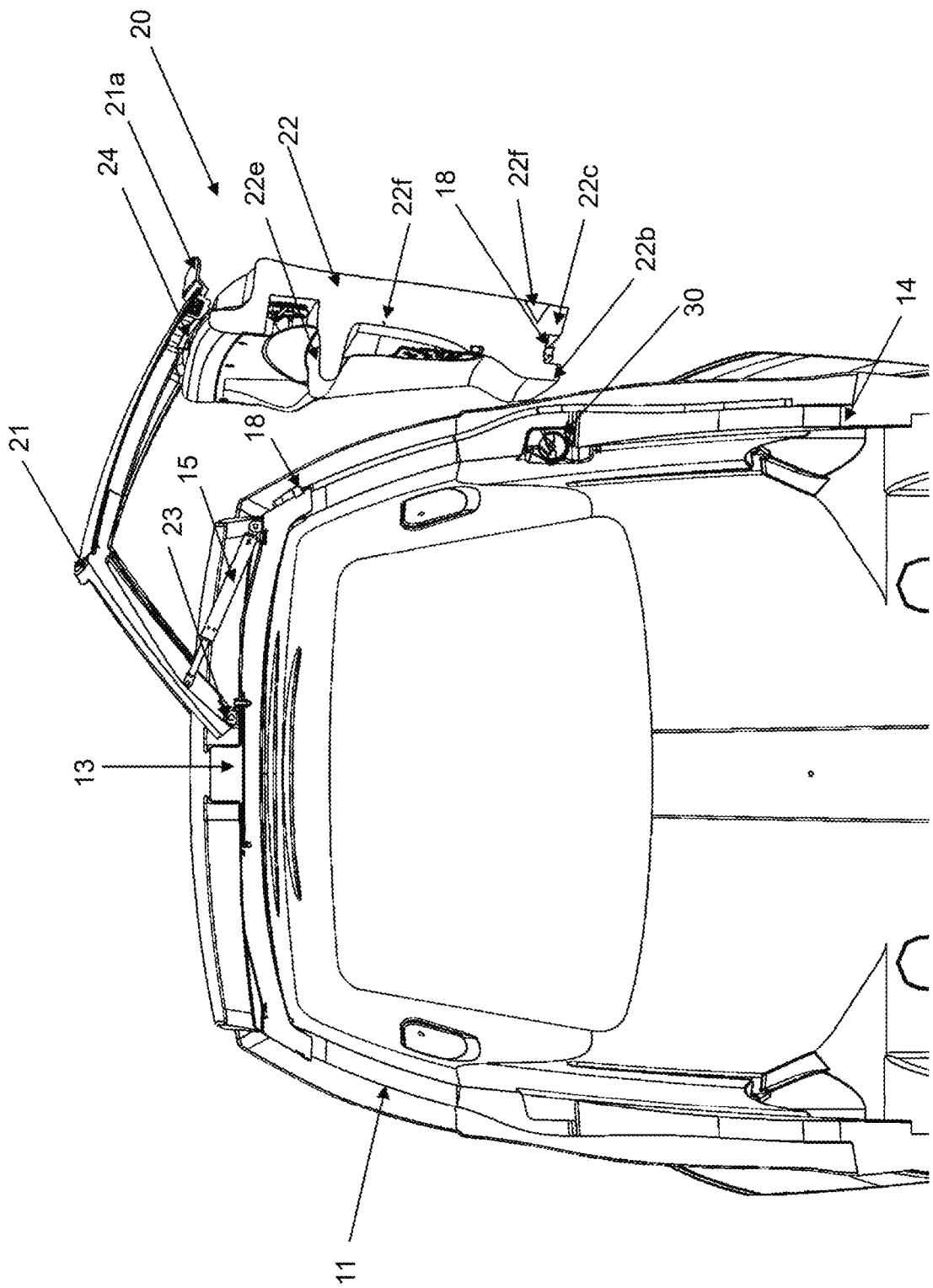
FIG. 2c represents a front view in cross-section of the vehicle with the door in its maximum lateral travel.
Figure 2D:
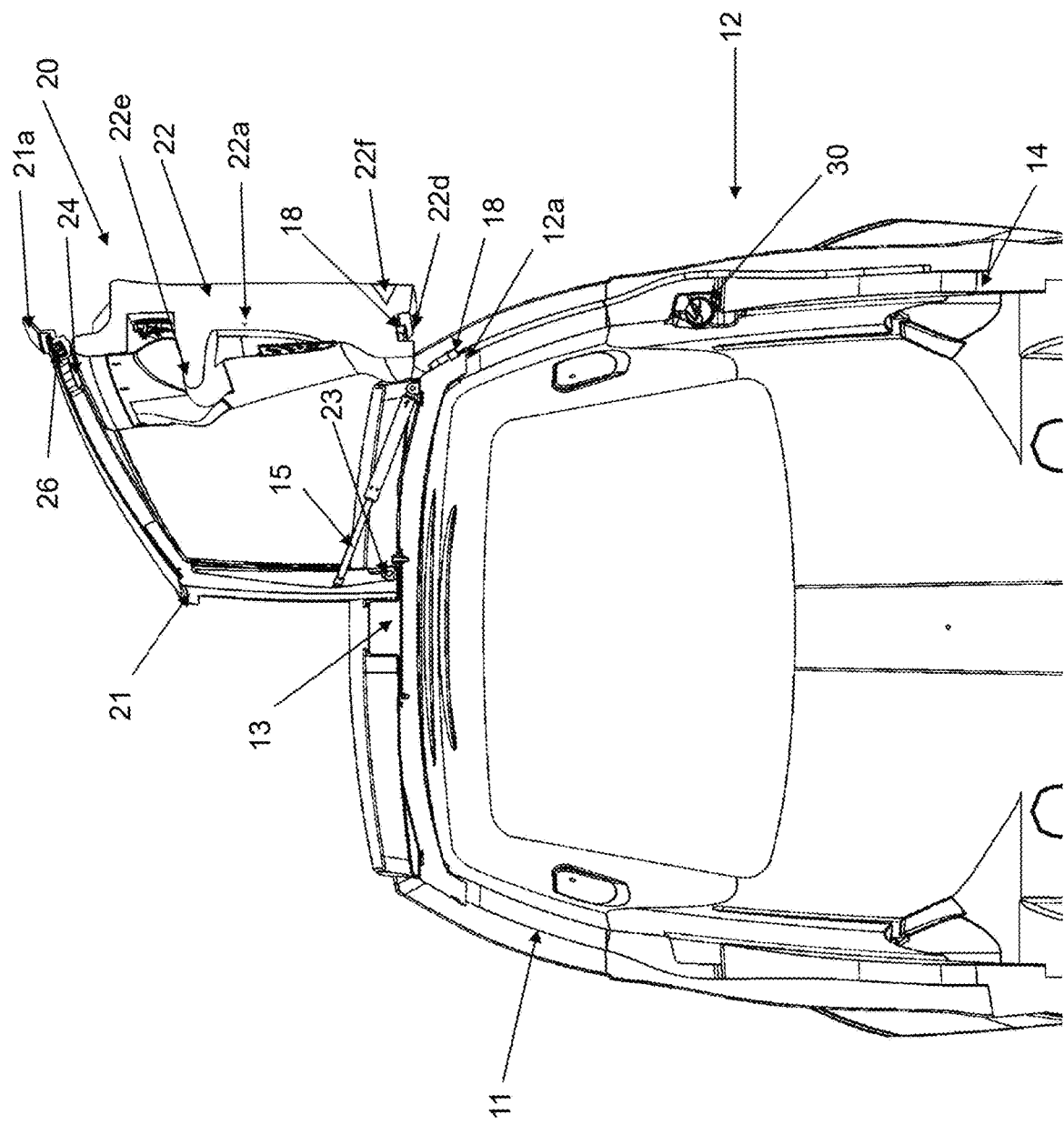
FIG. 2d represents a front view in cross-section of the vehicle with the door open.
Figure 3A:
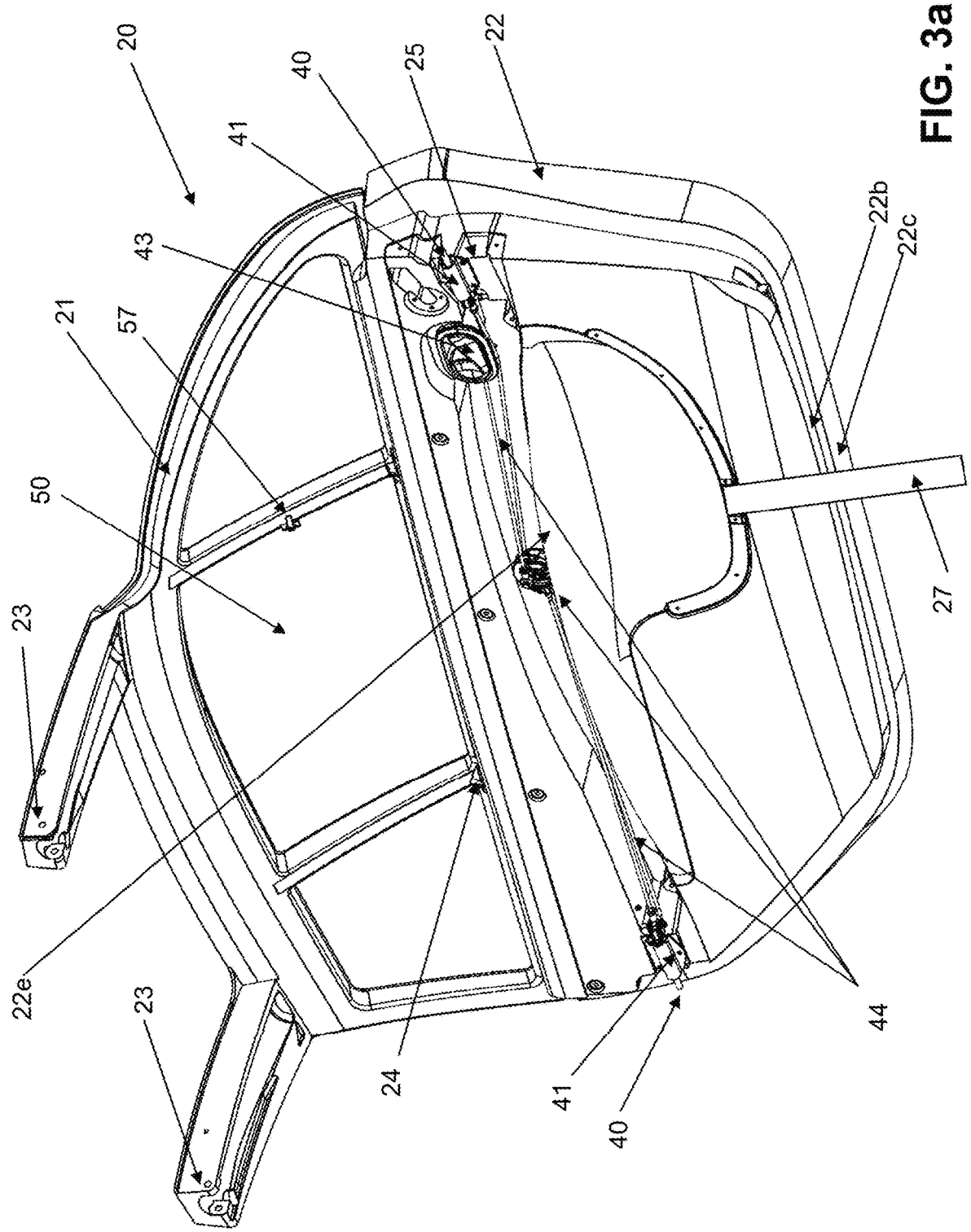
FIG. 3a represents a front perspective view of the interior of the door.
Figure 3B:
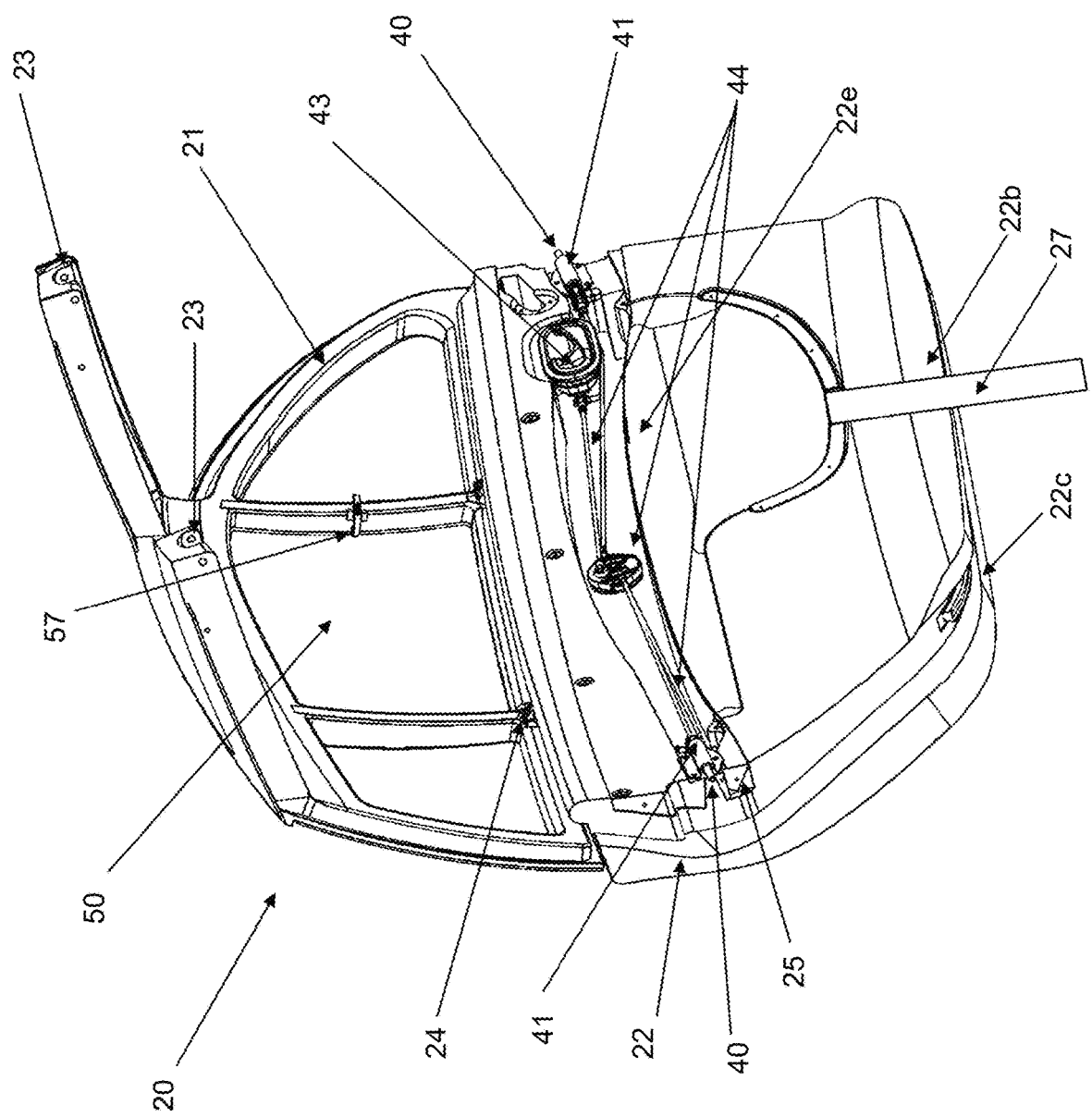
FIG. 3b represents a rear perspective view of the interior of the door.
Figure 4A:
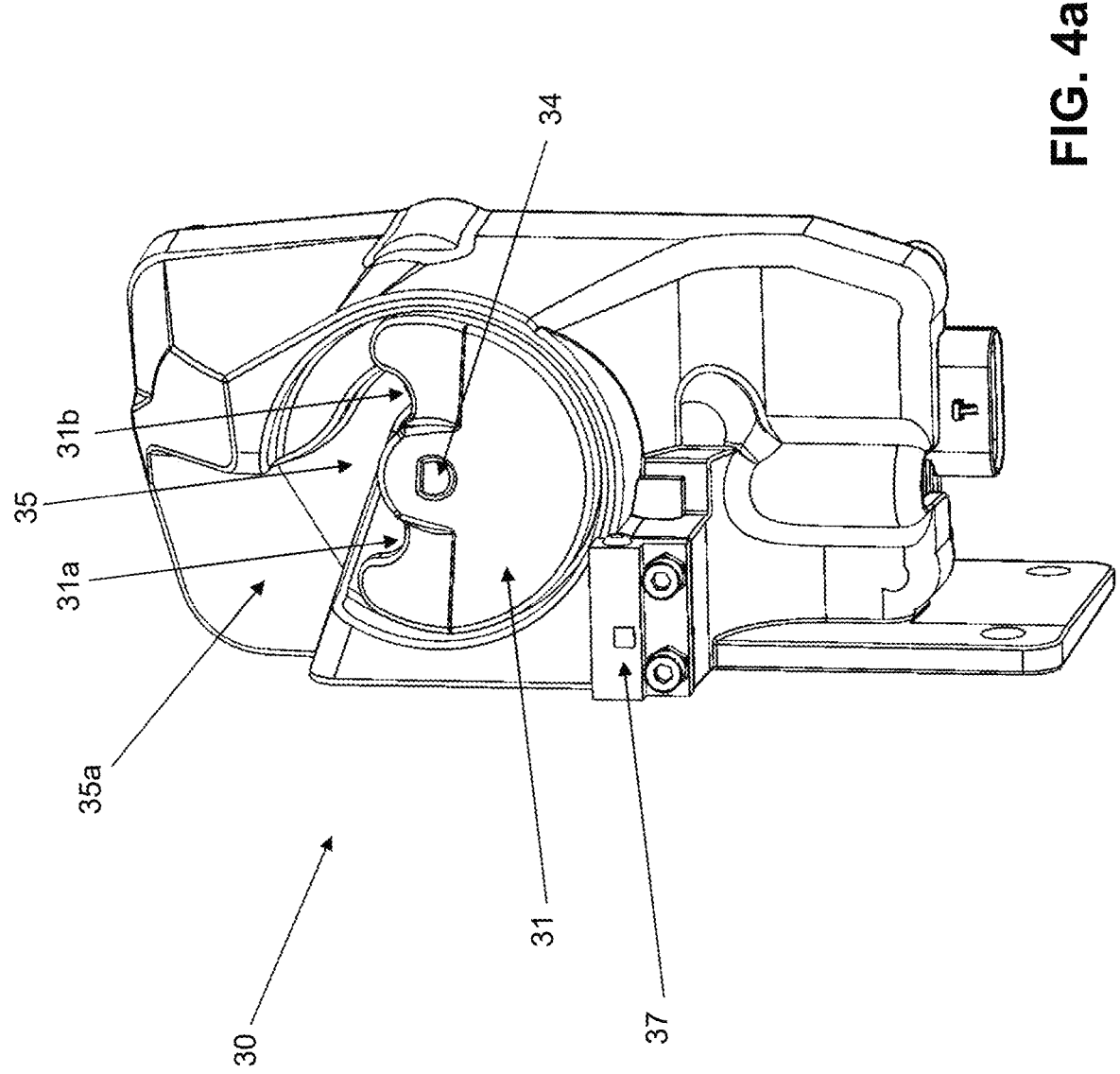
FIG. 4a represents a perspective view of the cam striker when the door is open or semi-closed.
Figure 4B:
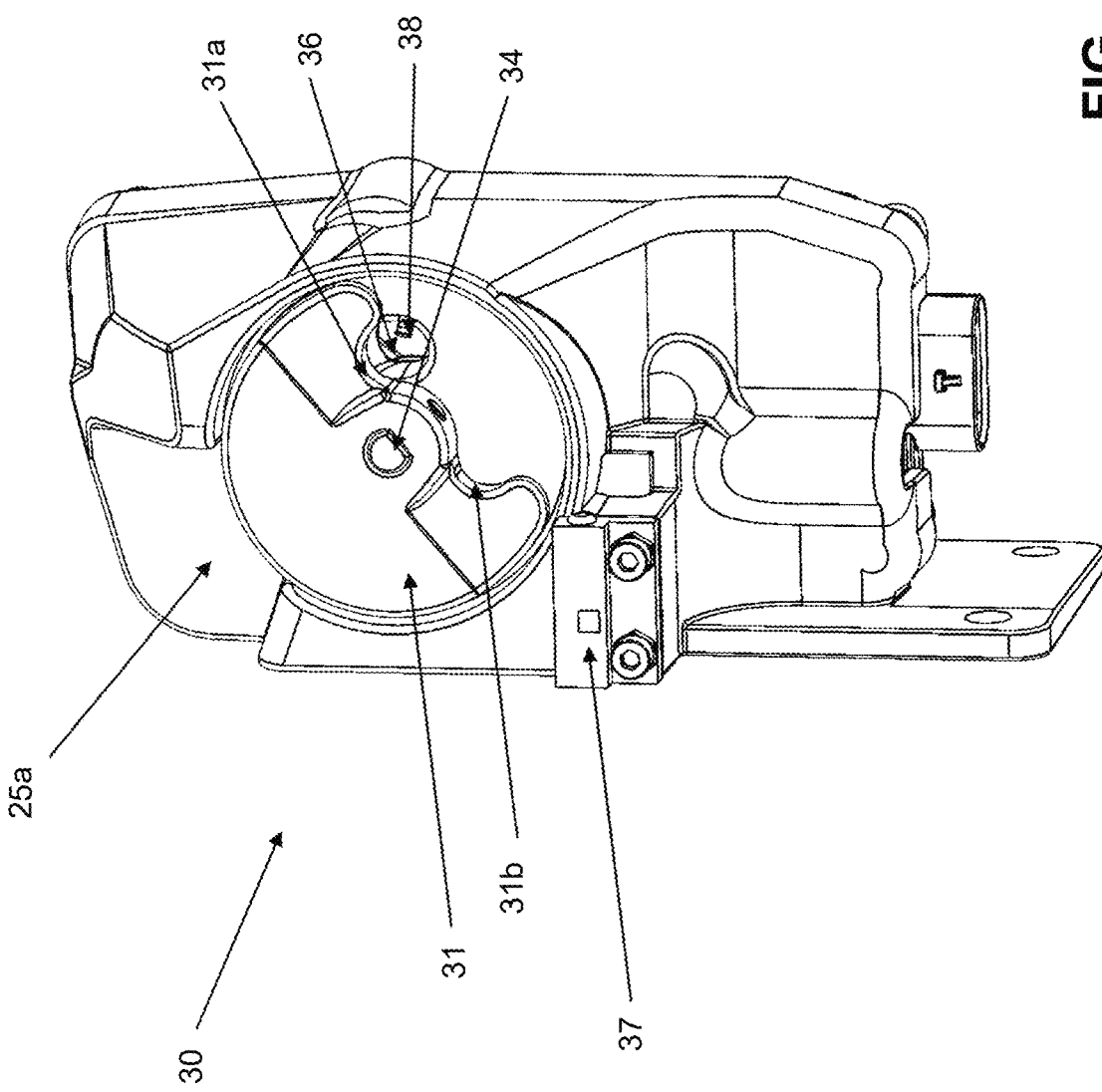
FIG. 4b represents a perspective view of the cam striker when the door is closed.
Figure 4C:
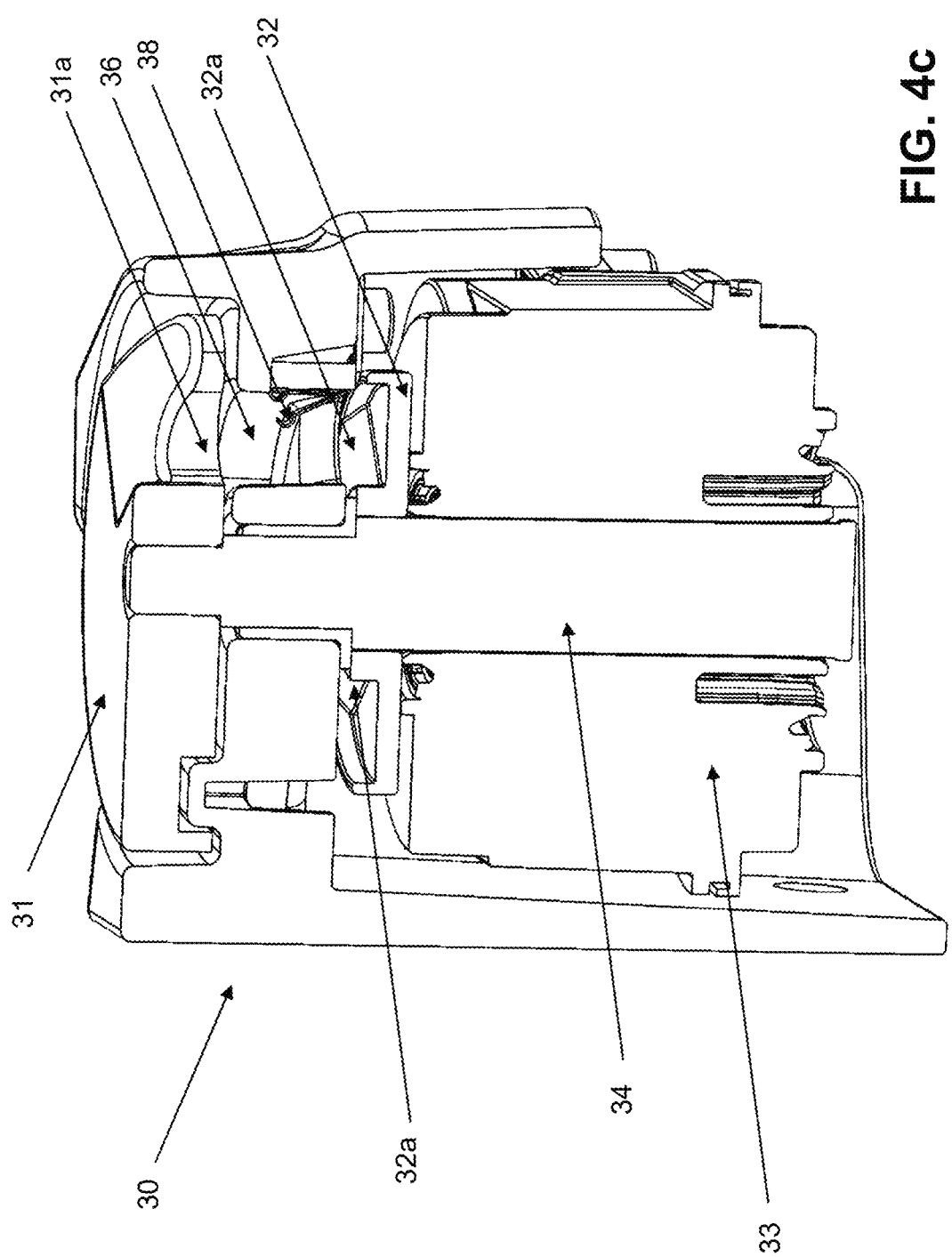
FIG. 4c represents a cross-sectional view of the cam striker.
Figure 4D:
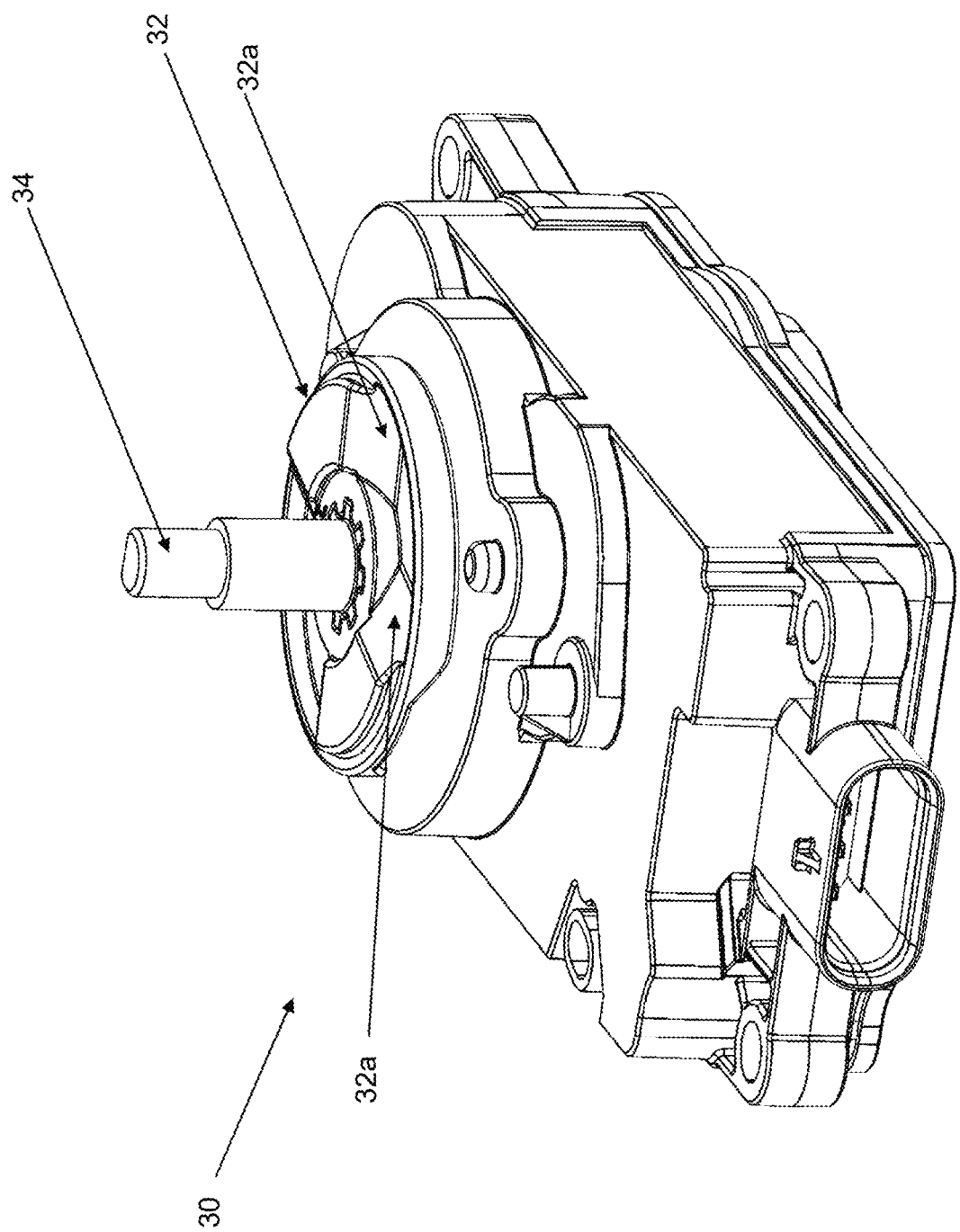
FIG. 4d represents a perspective view of the unlocking cam mounted on the cam axis.
Figure 5A:
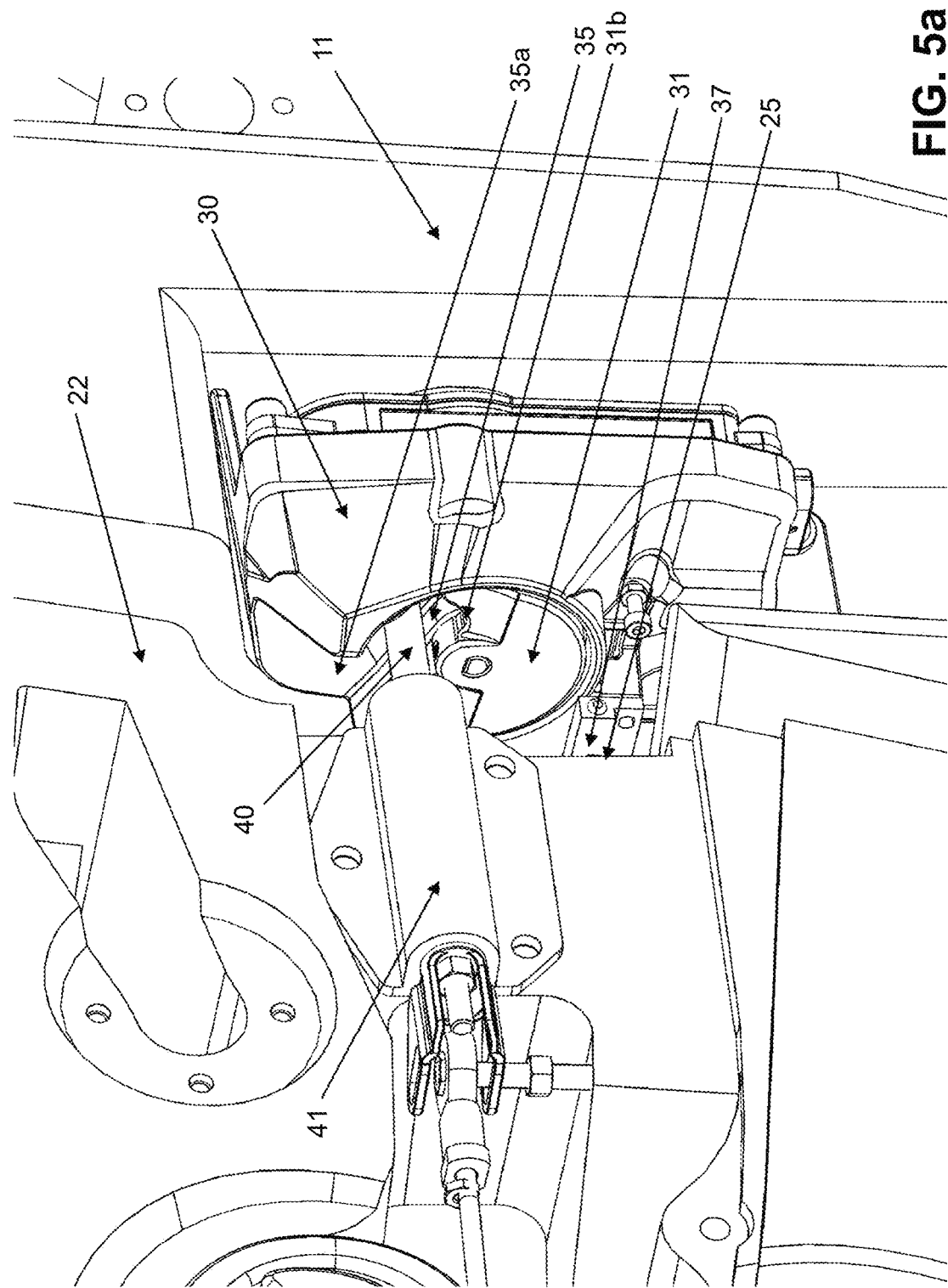
FIG. 5a represents a perspective view of the cam striker and of the sliding bolt in the vehicle in semi-closed position.
Figure 5B:
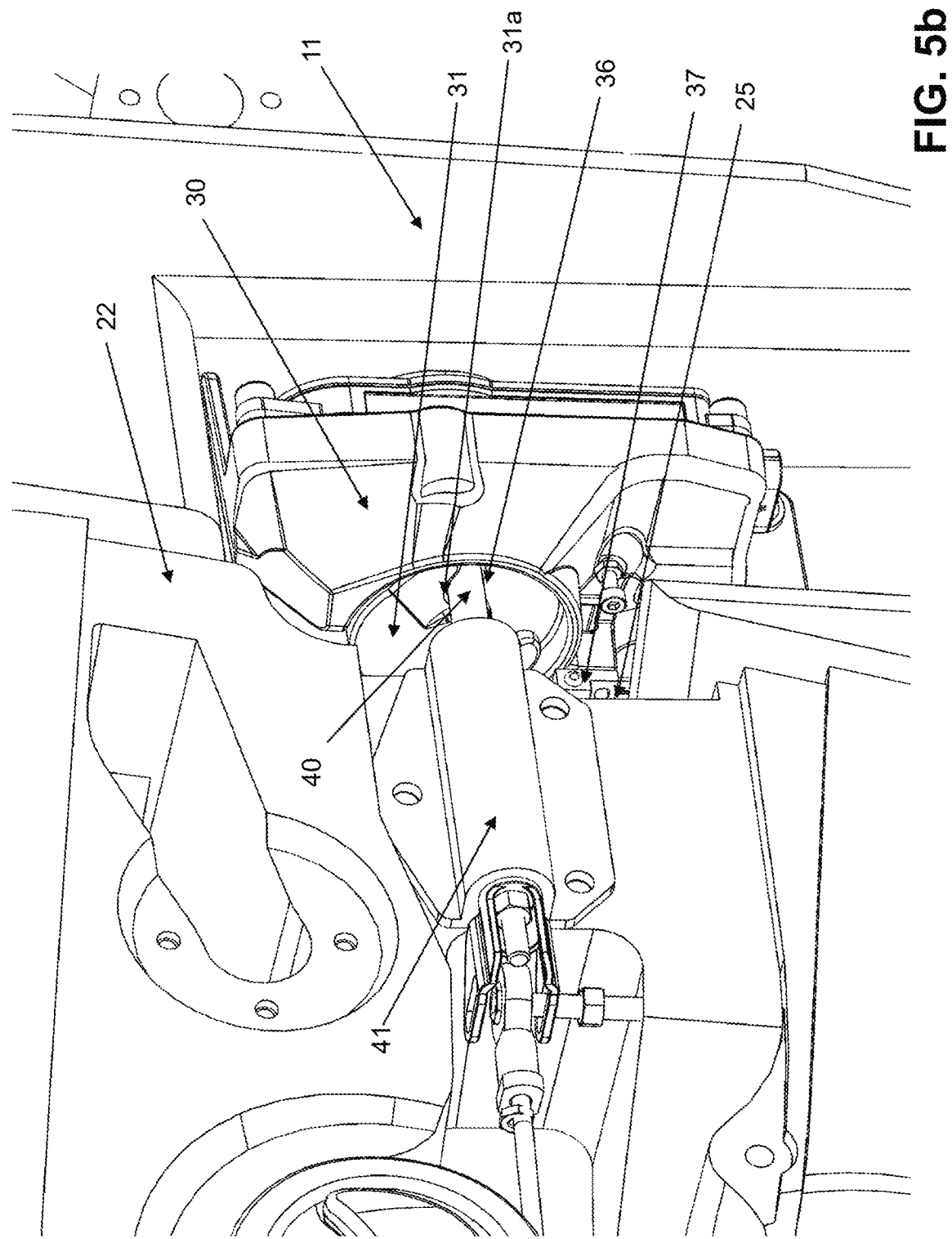
FIG. 5b represents a perspective view of the cam striker and of the sliding bolt in the vehicle in closed position.
Figure 6B:
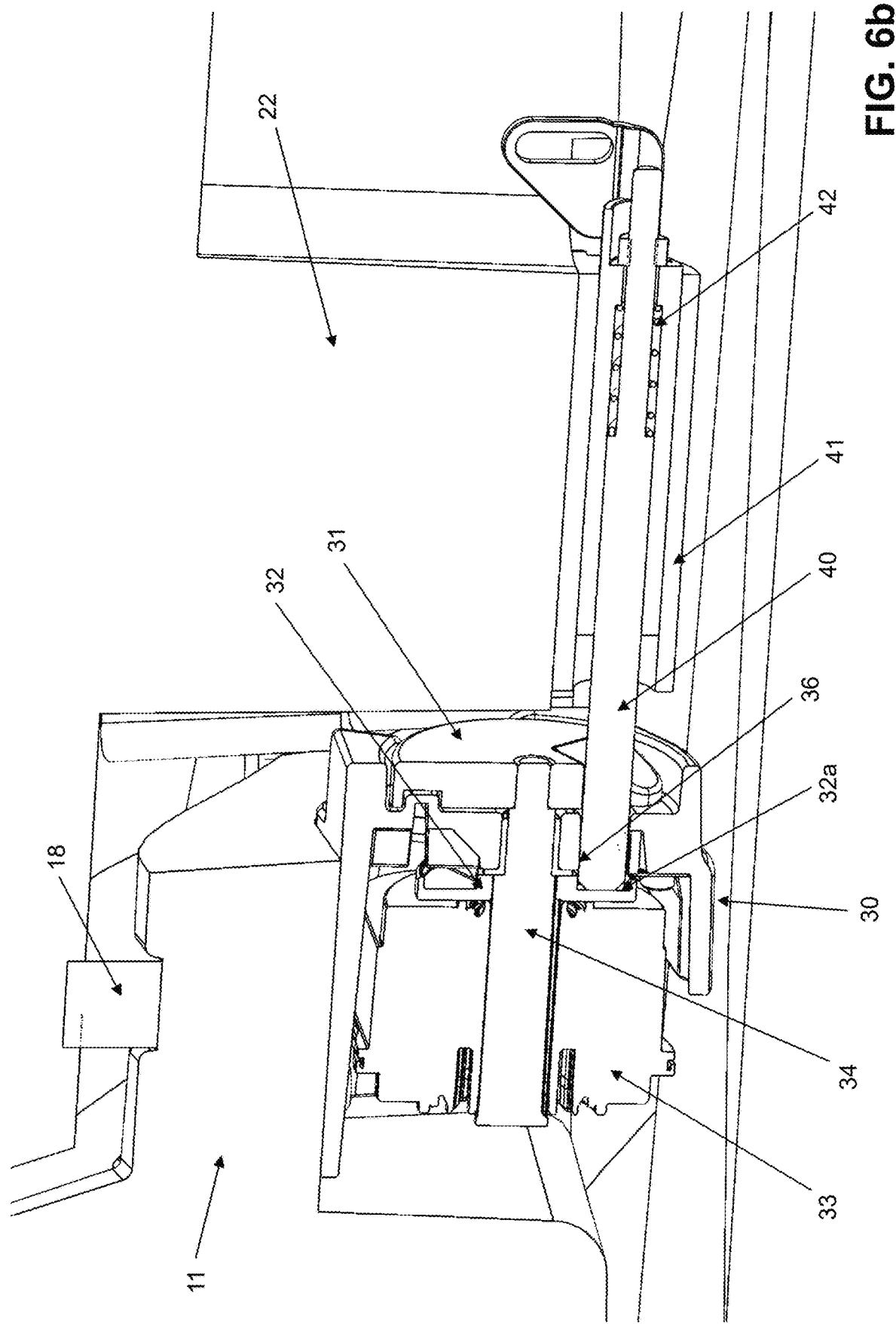
FIG. 6b represents a cross-sectional view of the cam striker and of the sliding bolt in locked position.
Figure 7A:
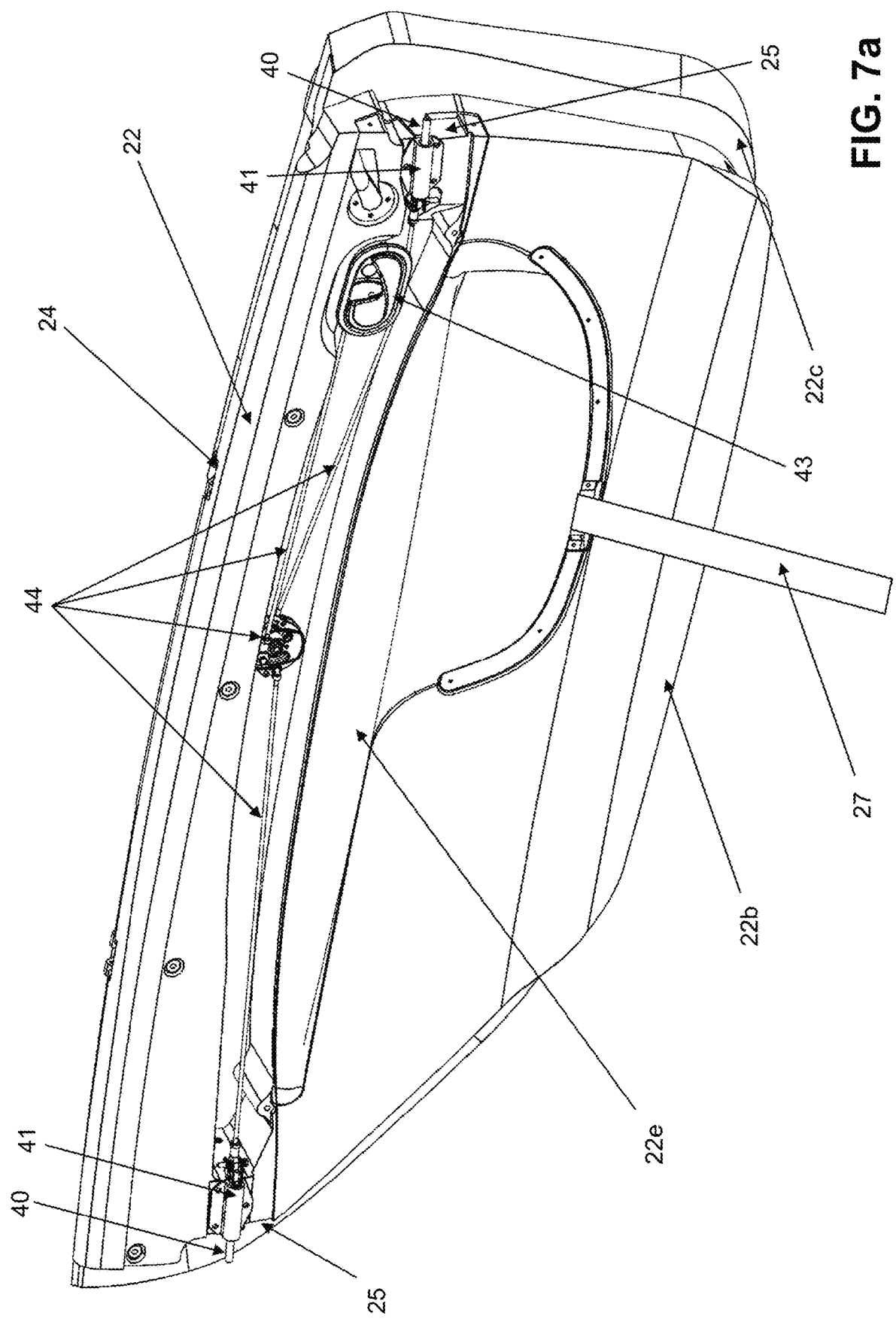
FIG. 7a represents a perspective view of the handle at rest.
Figure 7B:
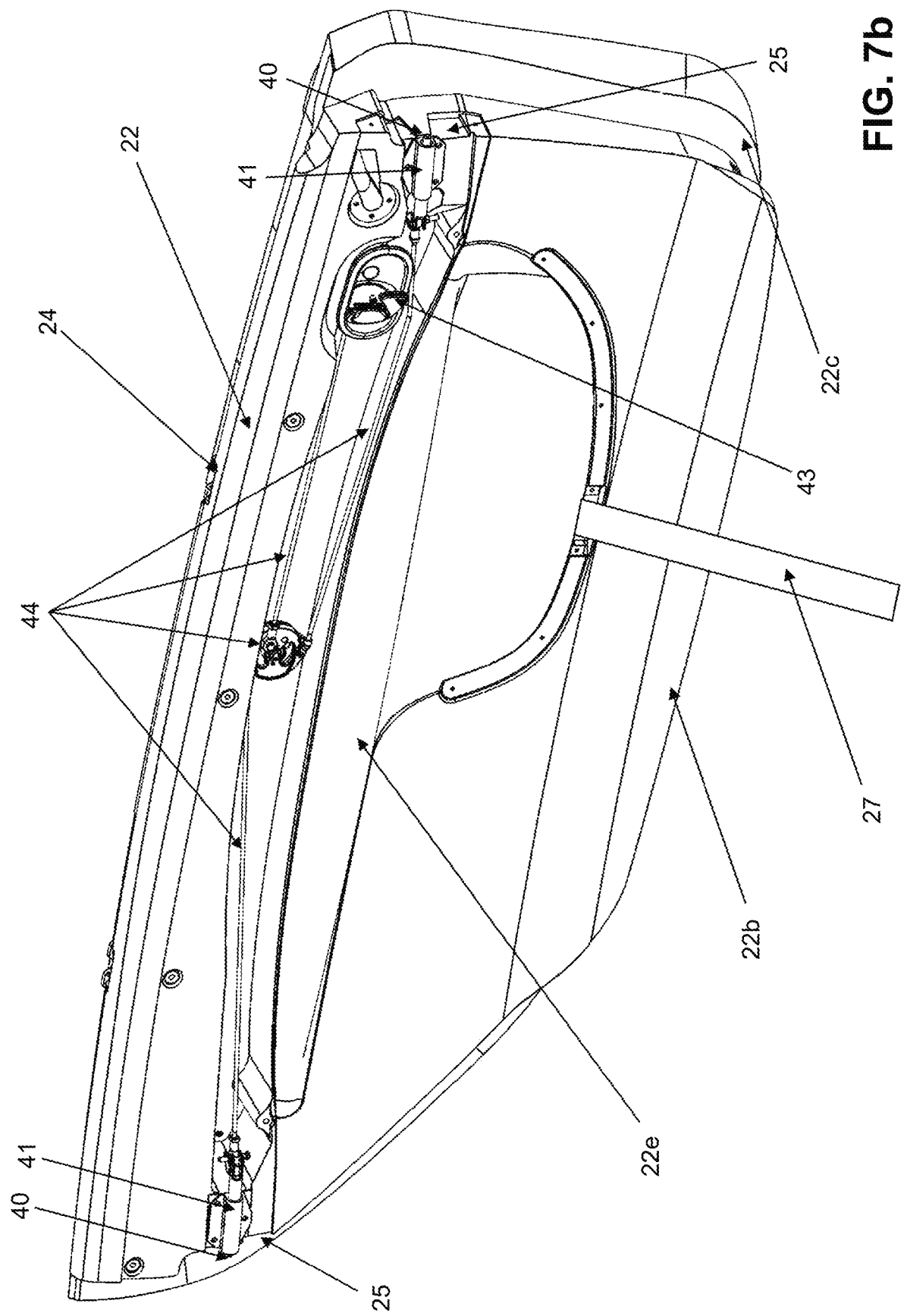
FIG. 7b represents a perspective view of the handle actuated.
Figure 8A:
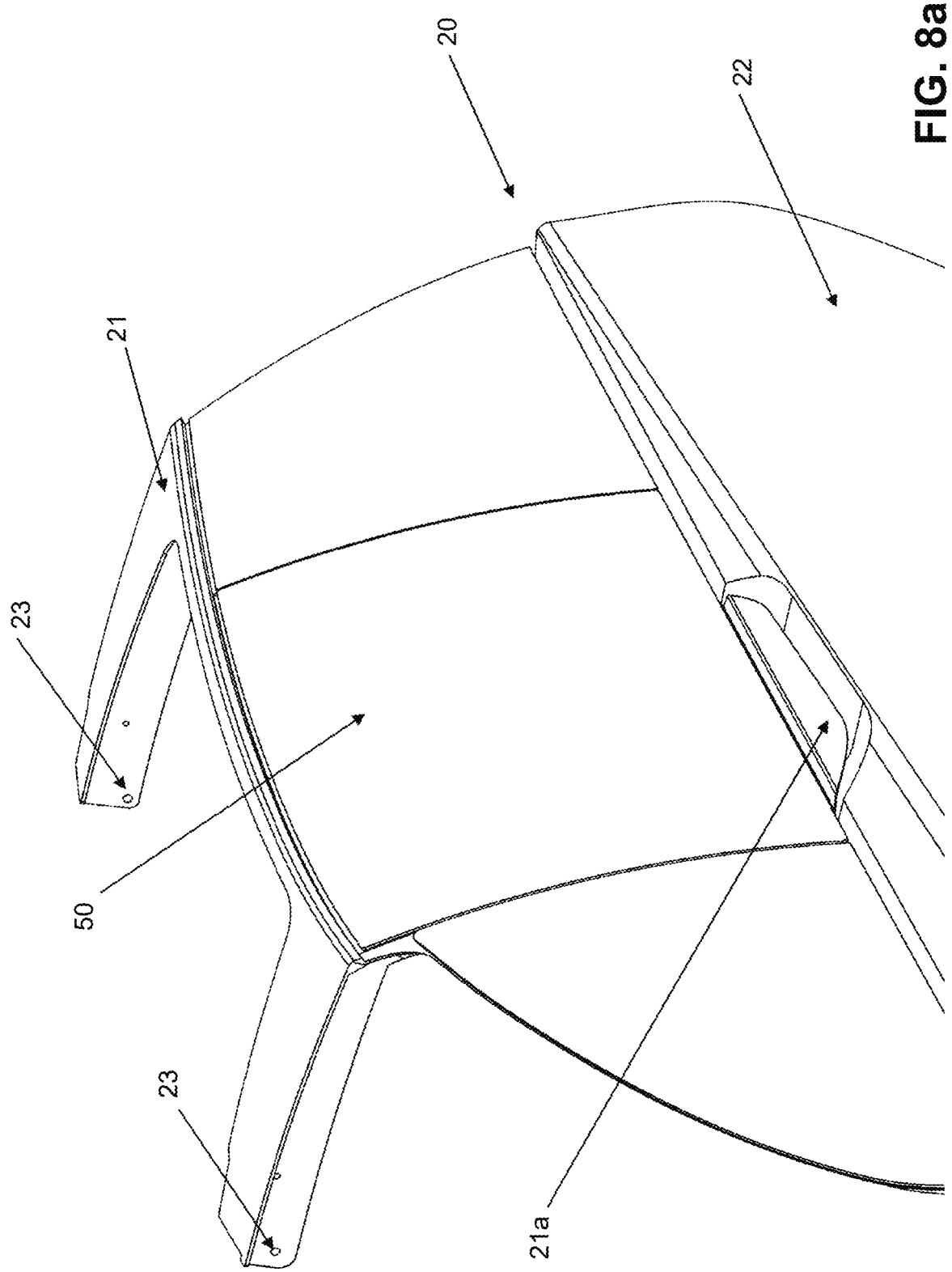
FIG. 8a represents a perspective view of the window closed.
Figure 8B:
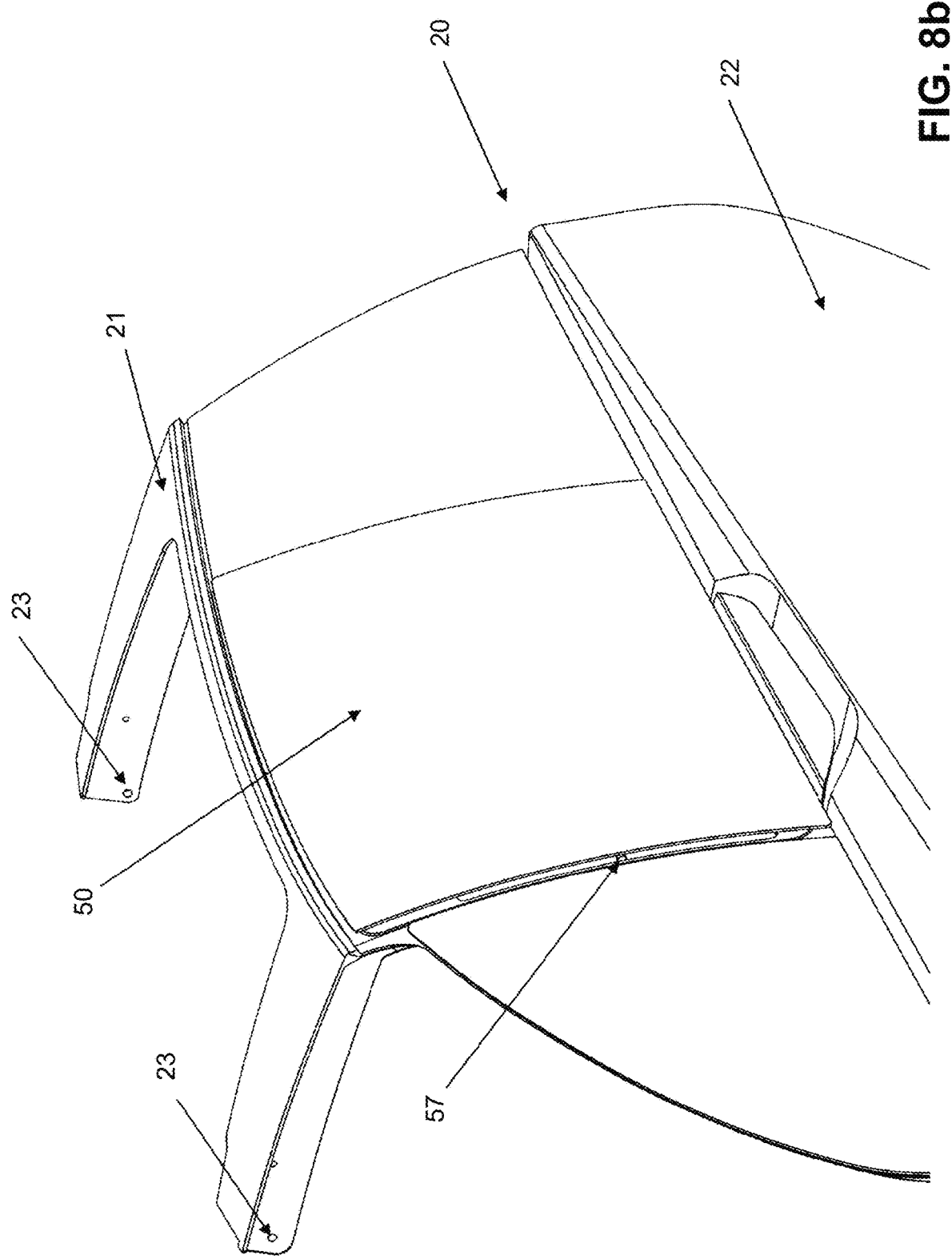
FIG. 8b represents a perspective view of the window semi-closed.
Figure 8C:
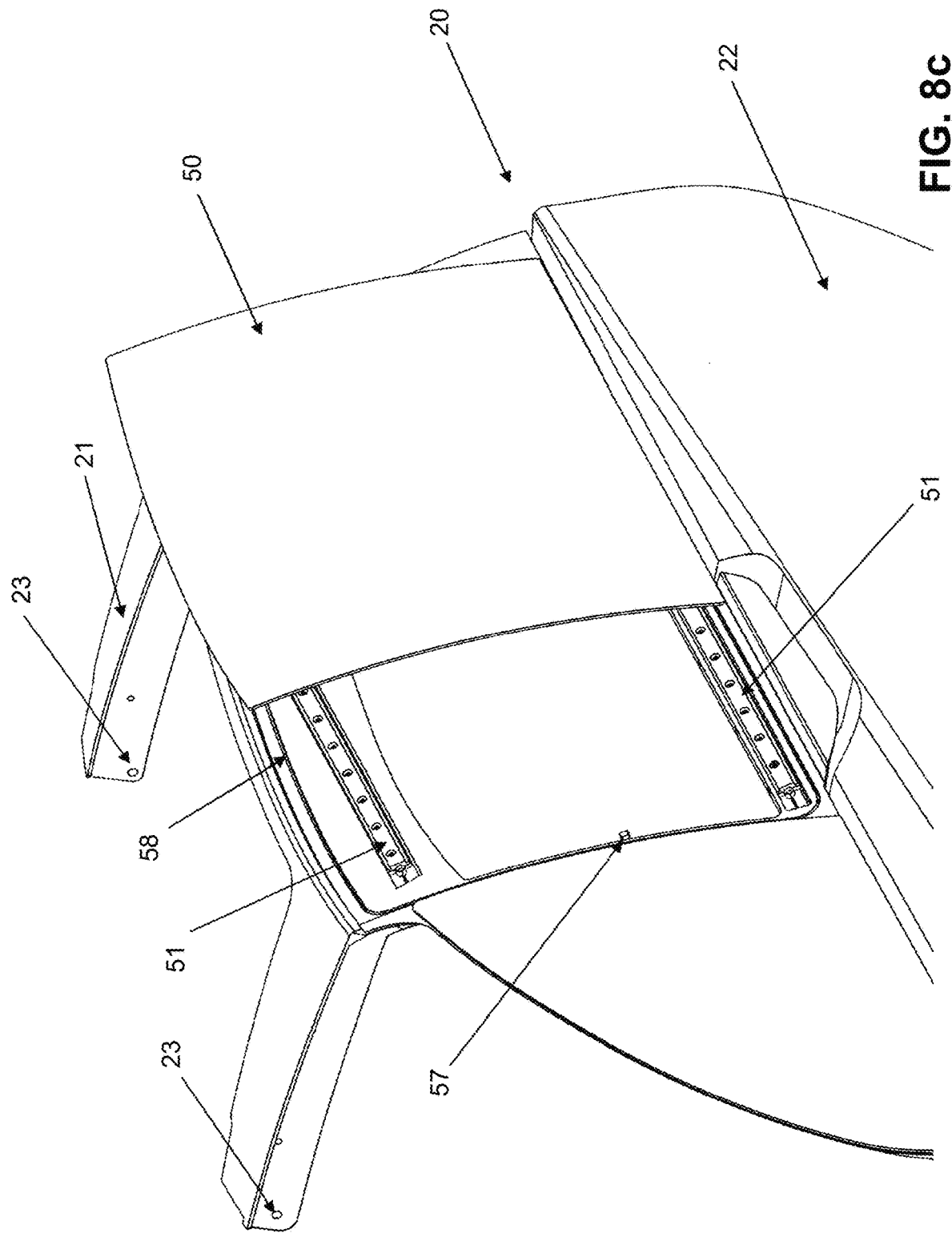
FIG. 8c represents a perspective view of the window open.
Figure 9A:
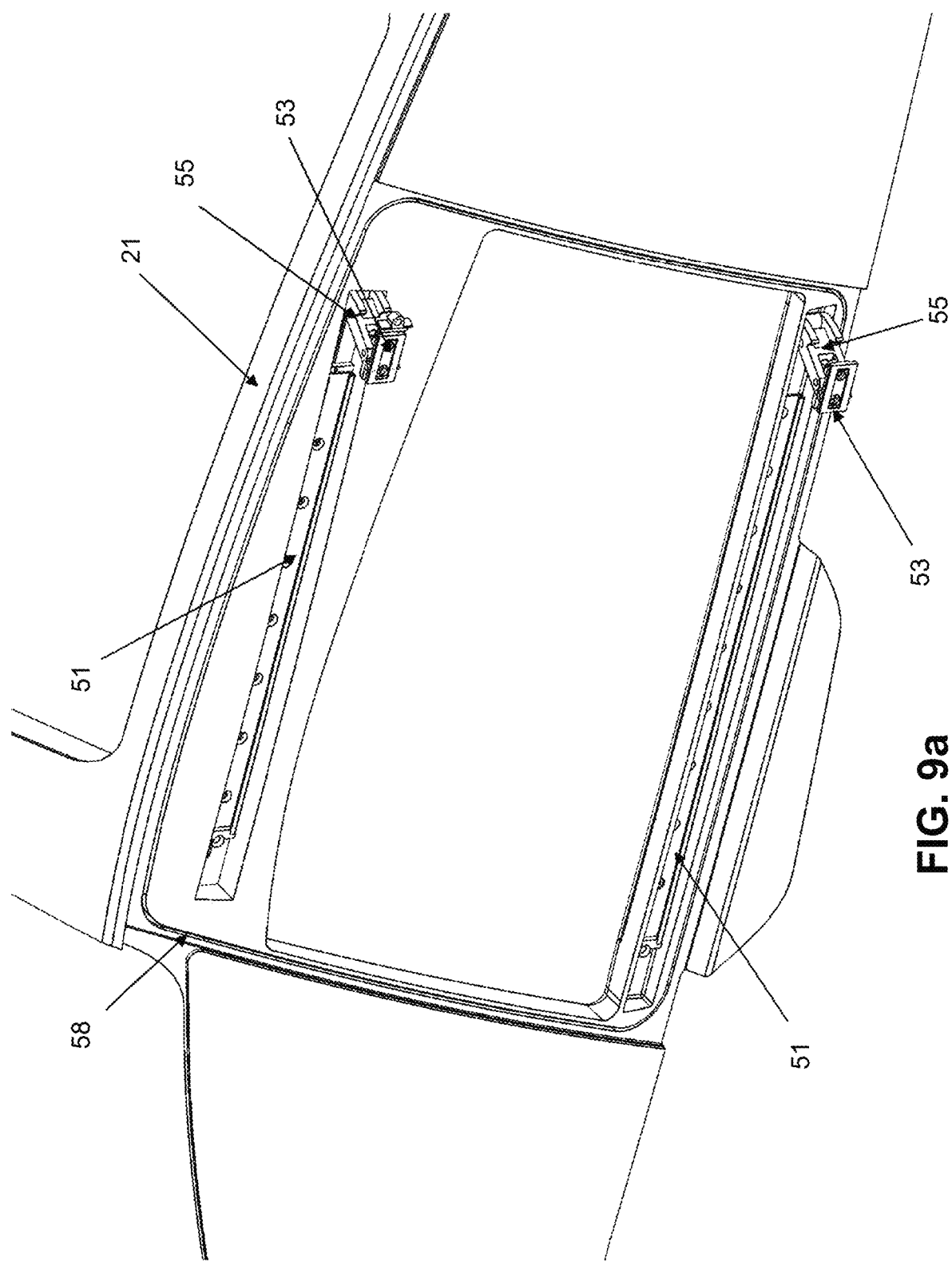
FIG. 9a represents a perspective view of the fixed part of the window system.
Figure 9B:
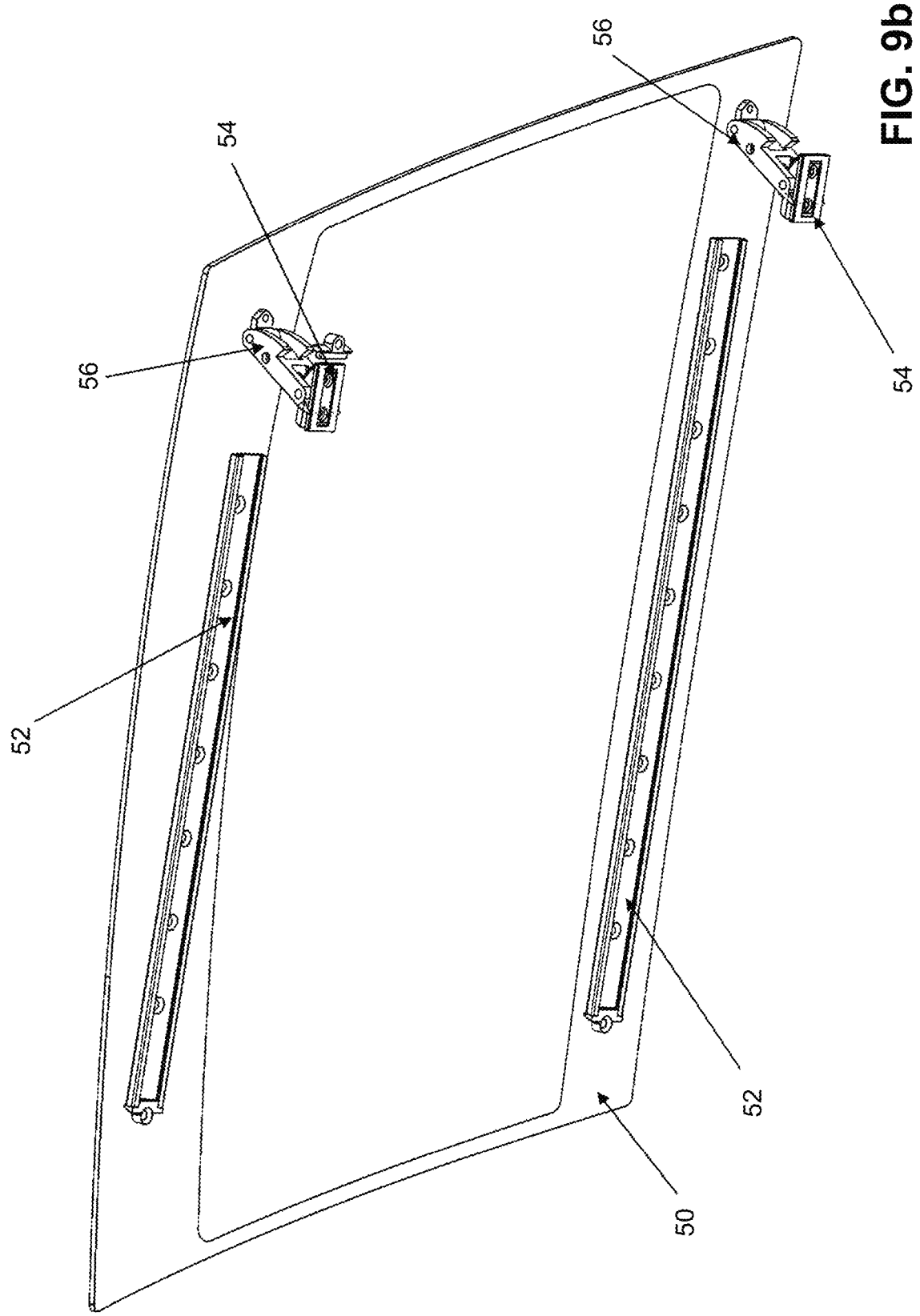
FIG. 9b represents a perspective view of the movable part of the window system.
Figure 11A:
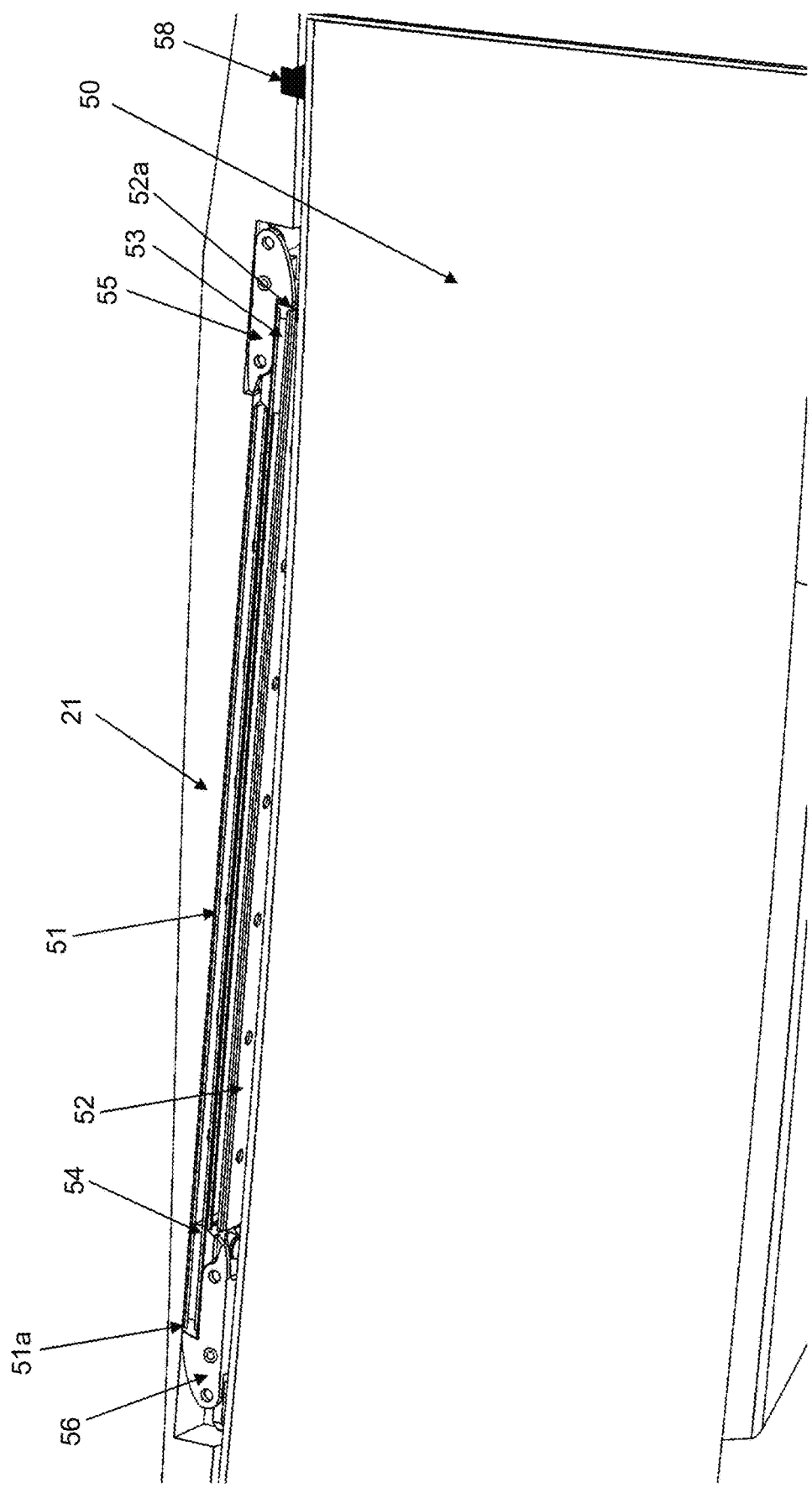
FIG. 11a represents a cross-sectional view of the window closed.
Figure 11B:
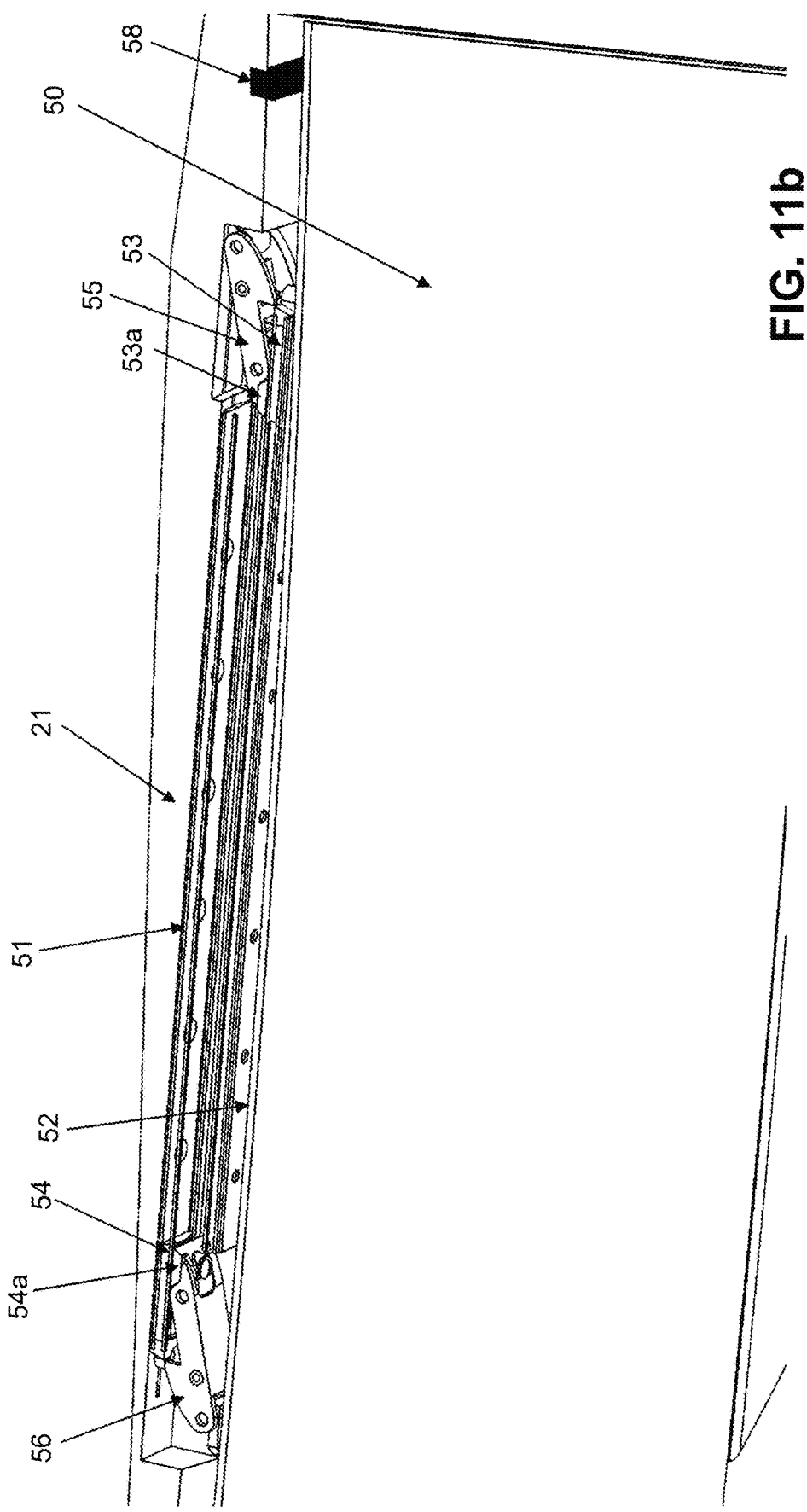
FIG. 11b represents a cross-sectional view of the window semi-closed.
Figure 11C:
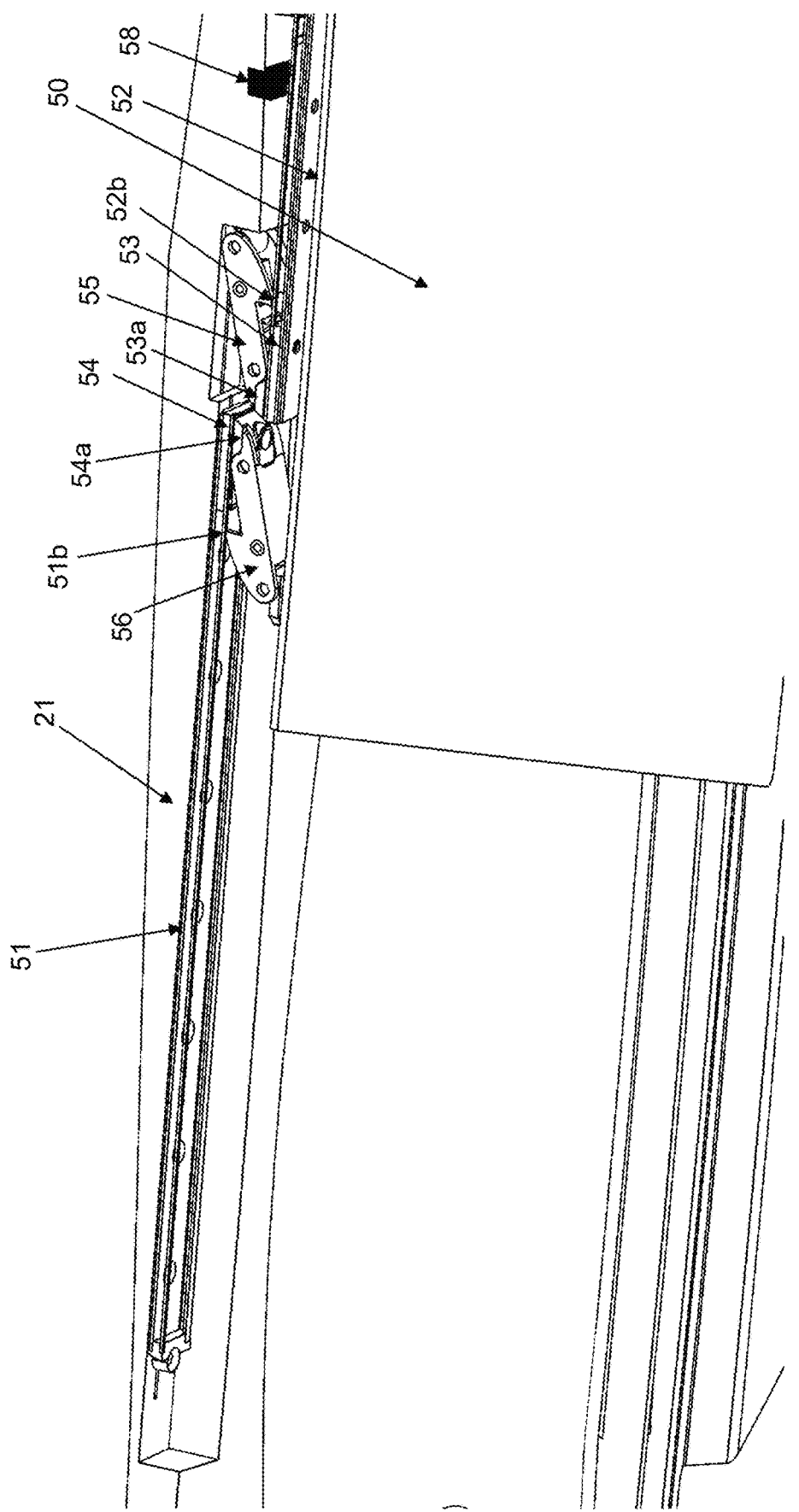
FIG. 11c represents a cross-sectional view of the window open.
Figure 13:
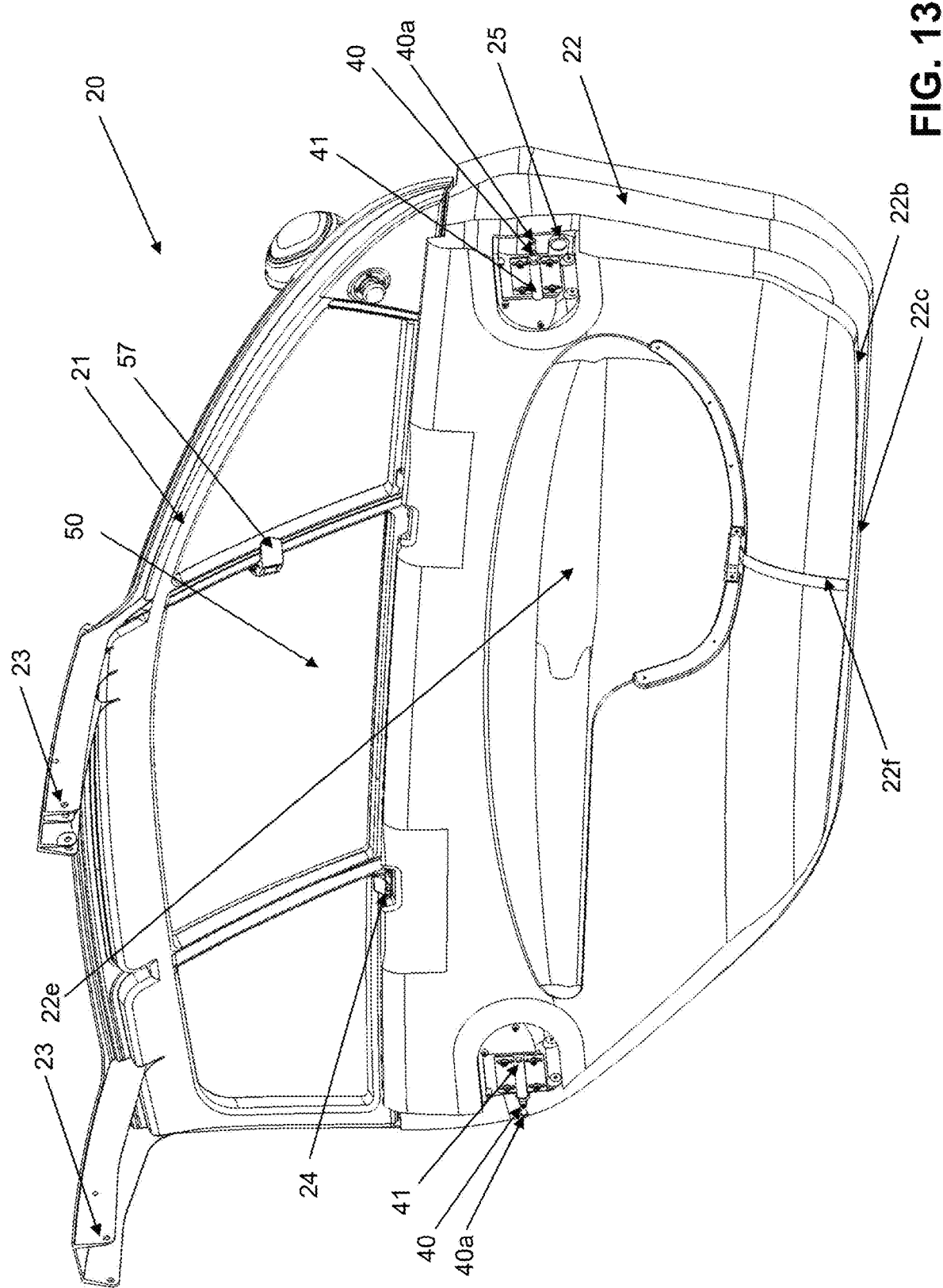
FIG. 13 represents a front perspective view of the interior of the door according to another embodiment (fixed sliding bolts).
Figure 14:
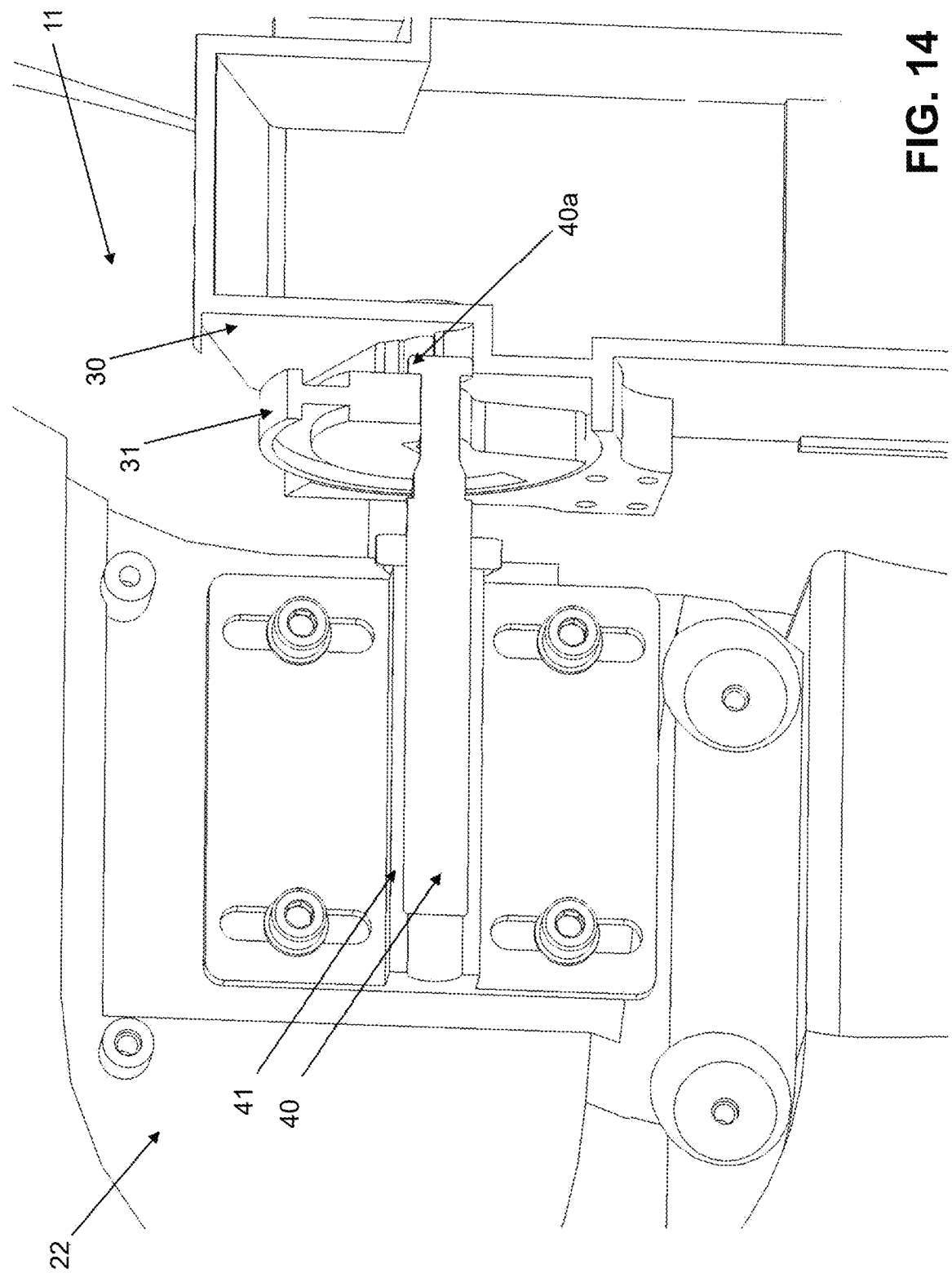
FIG. 14 represents a cross-sectional view of the cam striker and of the sliding bolt in locked position according to another embodiment (fixed sliding bolts and cam striker with non-reversible movement).
Figure 15A:
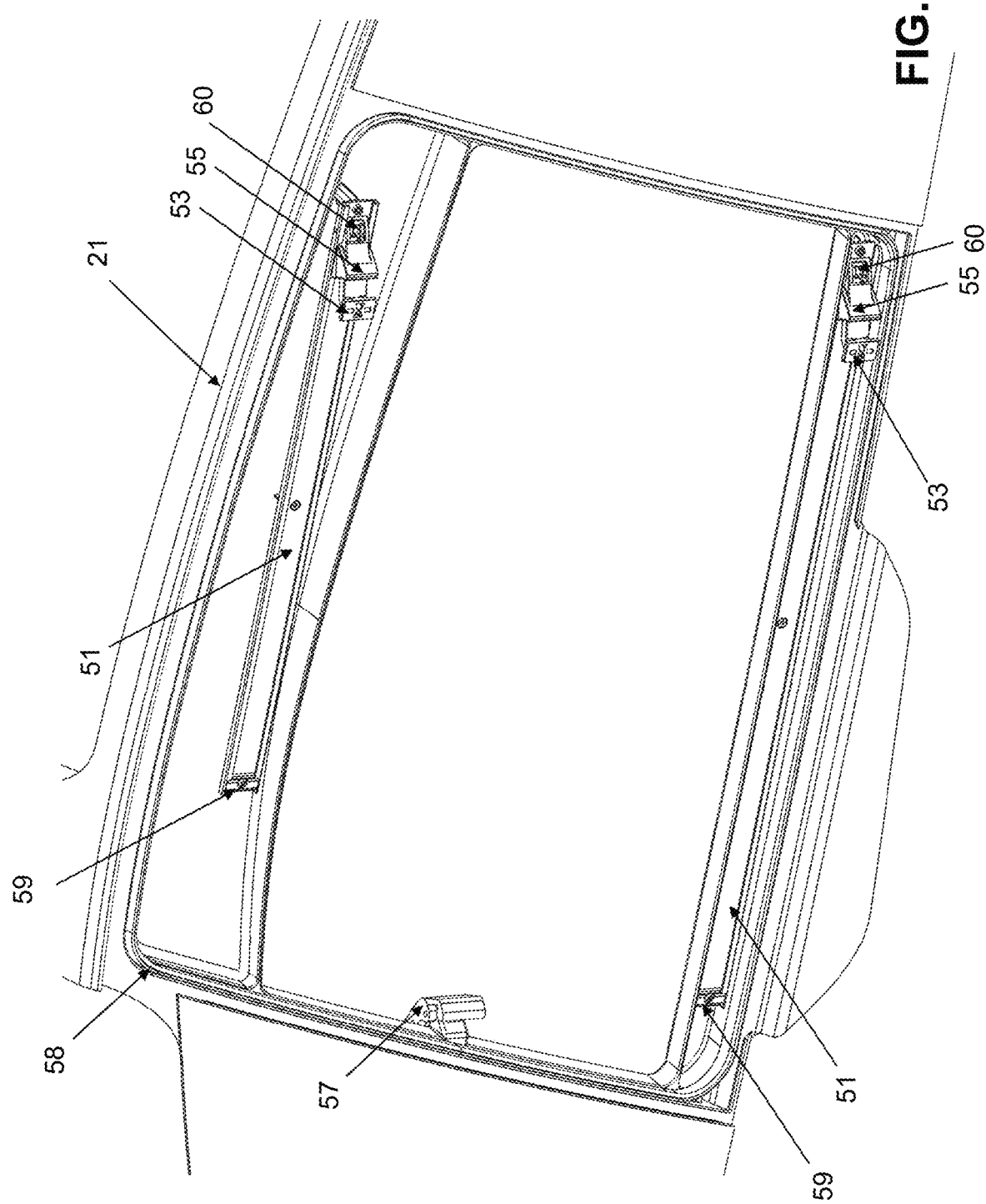
FIG. 15a represents a perspective view of the fixed part of the window system according to another embodiment.
Figure 15B:
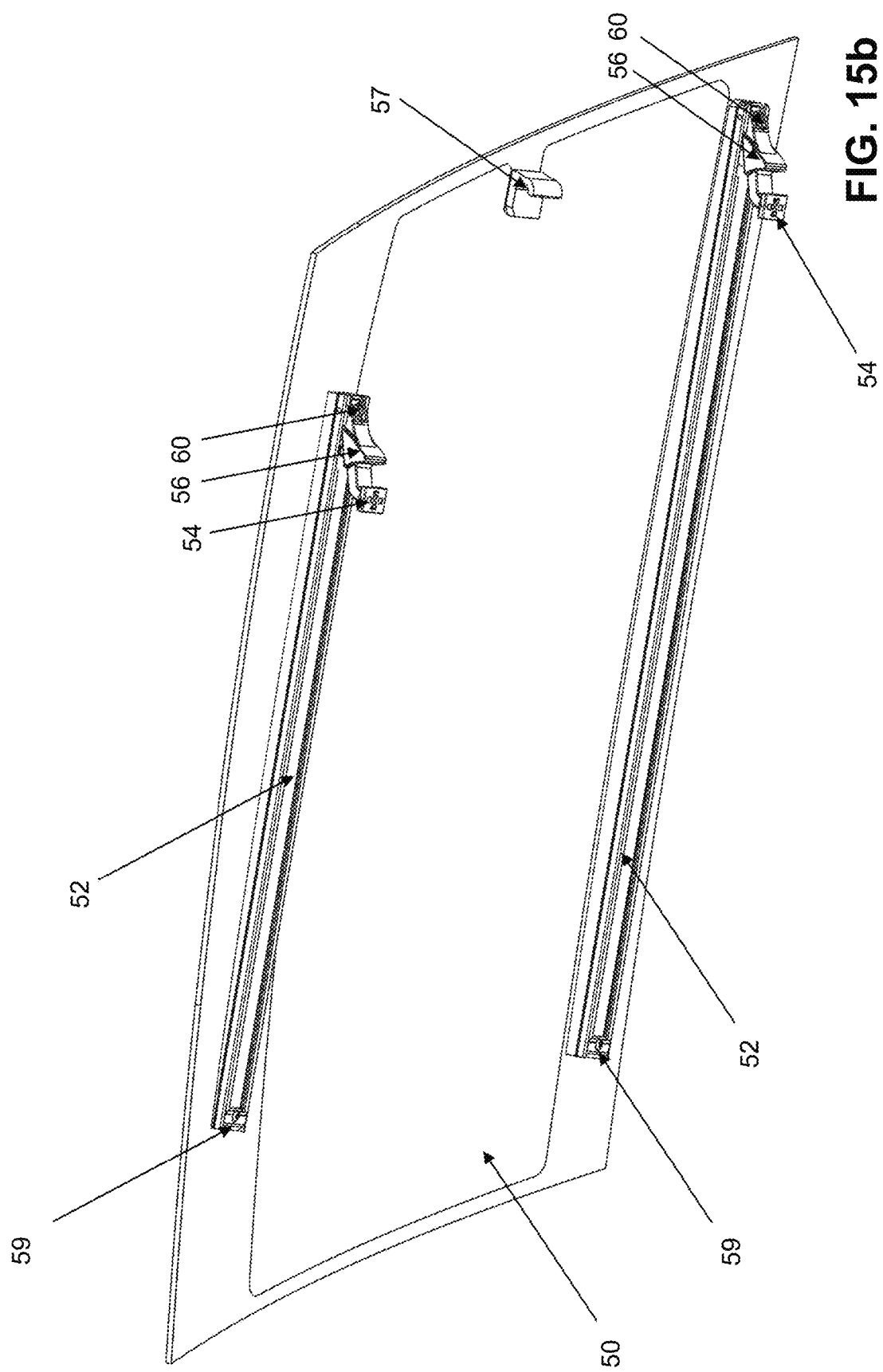
FIG. 15b represents a perspective view of the movable part of the window system according to another embodiment.
Figure 17A:
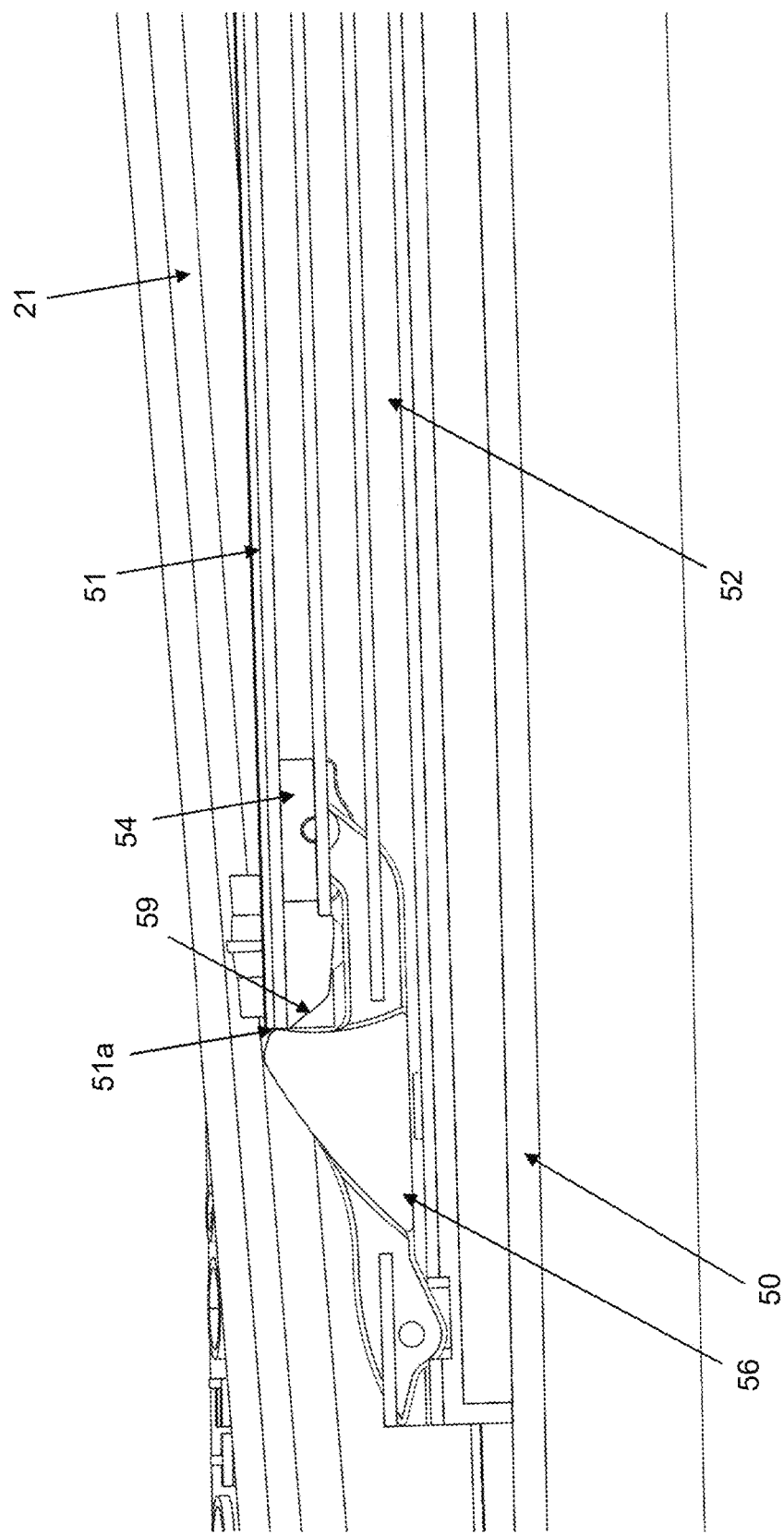
FIG. 17a represents a detail view of an element of the movable window system, in closed position, according to another embodiment.
Figure 17B:
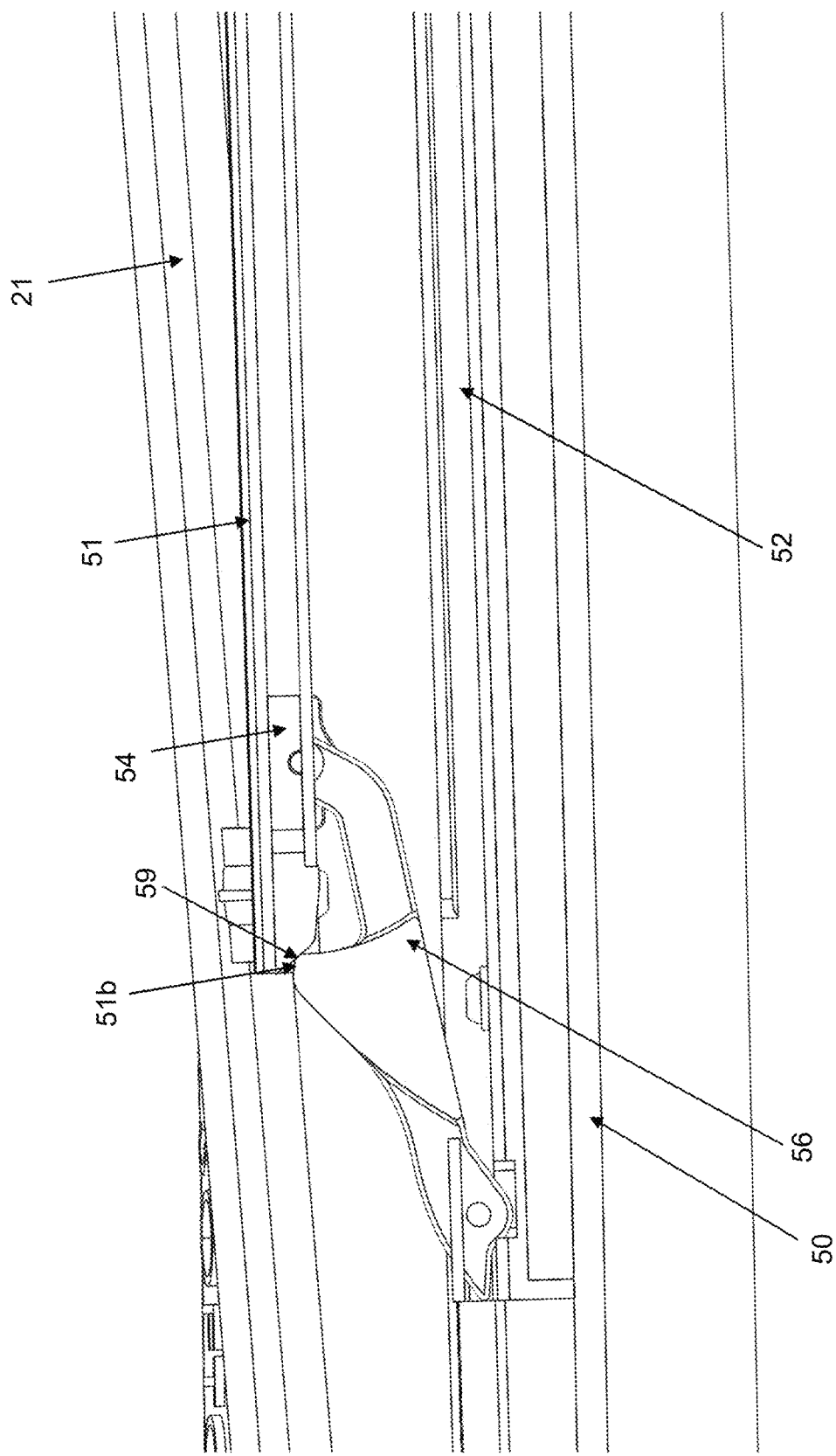
FIG. 17b represents a detail view of an element of the movable window system, between the closed position and the semi-closed position, according to another embodiment.
Figure 18:
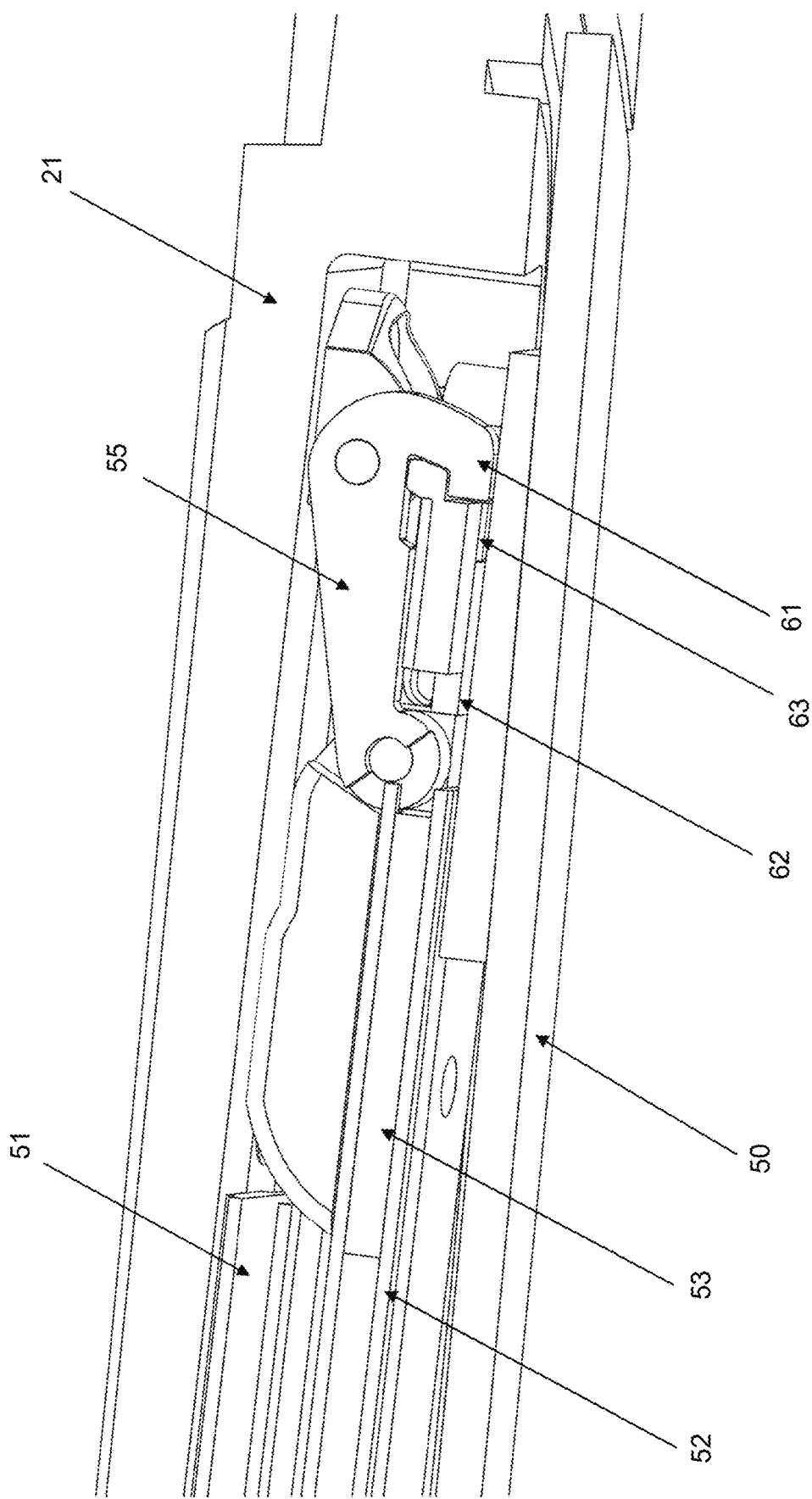
FIG. 18 represents a detail view of an element of the movable window system in closed position, according to an embodiment comprising a hook and a spring-mounted tongue.

Referring to the figures, the door (20) is provided to close an opening (12) produced in the body (11) of a vehicle (10). Said body (11) can be produced in a single block or be composed of several elements. It can also have surfaces with complex geometry. Said opening (12) can give access only to the front seats (16) or only to the rear seats (17). Said body (11) can also have two openings (12), one giving access only to said front seats (16) and the other giving access only to said rear seats (17). In this case, said body can be equipped with two doors (20) for each side. Likewise, said body can have an opening for each row of seats, and as many doors to close them, for example in the case of a van, a bus or a car. According to another embodiment represented in FIG. 1b, said opening (12) gives access to the front seats (16) and to the rear seats (17), and a single door (20) covers said opening (12).

Said door (20) comprises primarily a top frame (21) pivoting about a top pivot (23) placed on the roof (13) of said body (11), and a bottom door leaf (22) pivoting about a bottom pivot (24) placed on said top frame (21). Said door (20) is qualified as sectional. The axes of said top pivot (23) and bottom pivot (24) are substantially longitudinal.

Advantageously, said body (11) and said bottom door leaf (22) are composed of the same material in order for thermal expansions not to disrupt the operation of said door (20), and in order to have a color and a surface condition that are identical. Said top frame (21) can also be composed of the same material, even though that is less critical for the operation of said door (20). According to a particular and nonlimiting embodiment, said top frame (21) or said bottom door leaf (22), or both elements, is/are produced in synthetic material or fibers, which avoids damaging the external elements that they could touch, such as, for example, the sheet steel bodies of surrounding vehicles.

When said door (20) is in closed position, said top pivot (23) is significantly further away transversely than vertically from said bottom pivot (24). The opening or the closure of said door (20) is done therefore along the form of said body (11), said bottom door leaf (22) not moving away from said body (11) but rising or descending, allowing said door (20) to have a travel that exceeds by a minimal value, even a zero value, the overall width of said vehicle (10). In this way, said door (20) can be opened even when a person or an object, notably another vehicle, or a wall, is located in front of or in proximity to said door (20), alongside said vehicle (10). In addition, in open position, said bottom door leaf (22) has a height less than the height between said top pivot (23) and said bottom pivot (24). Thus, when said door (20) is in open position, the bottom of the bottom door leaf (22d) is higher than or at the same level as the height of the opening (12a). When a person wants to enter or exit said vehicle (10), he or she is therefore not hampered by said bottom door leaf (22) and avoids bumping into it.

According to a nonlimiting embodiment, said door (20) opens when it detects the presence of an element identifying its owner, for example an RFID chip contained in a card or a key, and/or when an opening button outside said door (20) is pressed. Said button can be located alongside said door (20). Thus, when a user presses on the button, the small lateral travel of said door (20) when it is opened means that the user can remain alongside said button and therefore alongside said door (20) without risking being struck by it, and without risking blocking its opening.

According to a nonlimiting embodiment, two parts produce said top pivot (23) and two parts produce said bottom pivot (24) in order to ensure a good stability of said door (20) when it is moving. In this case, the two parts producing said top pivot (23) and bottom pivot (24) are not very far apart longitudinally in order to be able to perform their function even if said body (11) has a surface with complex geometry.

When said door (20) is in closed position, the center of gravity of the door leaf (22a) is located more to the outside of said vehicle (10) in the transverse direction than said bottom pivot (24). This way, when said door (20) is closed, when said vehicle (10) is on a relatively horizontal surface, said bottom door leaf (22), being oriented toward the interior of said vehicle (10) by gravity, presses on the edges of said opening (12), and the door leaf opening stop (22b) and door leaf closure stop (22c) are housed on the door leaf anchor (14) without outside assistance. According to a nonlimiting mode of operation, in order to ensure this function even when the vehicle is on a slope, a door leaf spring (26) is installed between said top frame (21) and said bottom door leaf (22) in order to orient said bottom door leaf (22) toward the interior of said vehicle (10), independently of gravity. This spring can be, in a nonlimiting manner, a traction, compression or torsion spring or a torsion bar. Other equivalent means are of course possible to obtain the same effect.

Said door (20) preferably has three distinct positions: an open position, a semi-closed position (also called "semi-open" position), and a closed position. In the open position, said door (20) does not cover said opening (12) of said body (11), which makes it possible for the users to enter or exit said vehicle (10). In the semi-closed position, said door (20) is located in front of said opening (12), but the seal-tightness is not yet produced between the inside and the outside of the interior of said vehicle (10). Preferably, in this position, the door (20) is bearing on the door seals (18), but said door seals (18) are not compressed sufficiently to produce the seal-tightness. Said door (20) can also press on the edges of said opening (12). In addition, in this position, there is no element holding said door (20) in position, such that the latter can be covered with no particular effort. In the closed position, said door seals (18) are compressed such that the seal-tightness is produced between the inside and the outside of the interior of said vehicle (10). Said door (20) is blocked mechanically in this position such that it cannot be opened without effort, and it is ready to be locked in position. Between the closed position and the semi-closed position, said top frame (21) preferably pivots only by a few degrees about said top pivot (23).

In order to be brought from the semi-closed position to the closed position, said door (20) is provided with at least one sliding bolt (40), and at least one detectable element (25), preferably two of each, one at the front of said door (20) and the other at the rear of said door (20). For each detectable element (25) installed in the door (20), a door sensor (37) is installed in said body (11). For each sliding bolt (40) installed in said door (20), a cam striker (30) is installed in said body (11). According to a nonlimiting embodiment, said door sensor (37) is installed directly on said cam striker (30).

Said door sensor (37) and detectable elements (25) can for example be a Hall-effect sensor and a magnet, an inductive sensor and a metal part, an optical barrier and optical reflector, a mechanical switch and a mechanical stop, or an electric switch and an electric stop. The invention is not however limited to these elements and can use other equivalent means. These elements represent safety for the users. The switching of said door (20) from the semi-closed position to the closed position is performed by the actuation of mechanical elements that can injure the user. These elements will be able to be moved only when said door sensors (37) detect the presence of said detectable elements (25). In this position, the mechanical elements will no longer be accessible for the users, and moving them will not therefore be able to injure them.

When said door (20) is closed, the latter is brought manually from the open position to the semi-closed position. For that, a grip strap (27) can be installed on said bottom door leaf (22) in order for the user to be able to bring said door (20) into semi-closed position, even when seated inside said vehicle (10). An armrest (22e) on said bottom door leaf (22) can provide assistance at the end of the movement, the user being able to simply press on this armrest.

Advantageously, said armrest (22e) is not a separate part mounted on said bottom door leaf (22), but is a geometry forming an integral part of said bottom door leaf (22) in order to be rigid and avoid fixings which would represent a weak point (and avoid losses of time for mounting operations). From the outside, a frame handle (21a) is installed on said door (20) to have a grip zone which guides the hand out of said bottom pivot (24) to avoid it being jammed between said top frame (21) and said bottom door leaf (22). A door leaf handle (22f) can also be installed, lower than said frame handle (21a), and thus be more accessible for people of small size. In another embodiment, the movement is not performed manually but it is assisted and/or performed automatically by appropriate means (motor, transmission, etc.).

In semi-closed position, said sliding bolt (40) is located at the inlet of a guiding groove (35) hollowed out in said cam striker (30), and said door sensors (37) are facing said detectable elements (25) of the door (20) so as to be able to detect their presence. This detection triggers the rotation of a cam motor (33) which drives the rotation of a cam axis (34) on which a closure cam (31) is mounted in said cam strikers (30). Said closure cam (31) has a closure cavity (31a). Upon the rotation of said closure cam (31), said closure cavity (31a) is placed around said sliding bolt (40) then drives it in its movement thus pulling above and, by the same stroke, pulling said door (20) toward the inside of said vehicle (10), compressing said door seals (18) to reach the closed position. This closure is thus done without "slamming" said door (20). There is a small air volume displacement, not creating any overpressure in the interior, thus making it possible to eliminate the overpressure valves which are heavy, costly and generally produced in non-recyclable elastomers. These valves are essential in most current production vehicles. The closure of the door is thus more comfortable for the users installed in the vehicle.

When said door (20) is placed manually in the semi-closed position, the positioning of said sliding bolt (40) is not precise. The guiding groove inlet (35a) of said guiding groove (35) and said closure cavity (31a) have dimensions greater than the diameter of said sliding bolt (40) in order for said closure cavity (31a) to be able to push said sliding bolt (40) into said guiding groove (35) even if said sliding bolt (40) is badly positioned at the start.

Said door (20) has a locking system to prevent it from being opened from the outside. According to one embodiment, said cam motor (33) or its transmission system making said closure cam (31) pivot has a non-reversible movement. Said door (20) is, de facto, locked in this closed position. This is the case, for example, if said closure cam (31) is fixed onto a pinion driven in rotation by a worm screw having a small helix angle. The invention is not however limited to these elements and can use other equivalent means.

According to another embodiment, said sliding bolt (40) is slide-rail-linked in a sliding bolt recess (41), a sliding bolt spring (42) pushing it toward the outside of said door (20). When it is pulled into said guiding groove (35) by said closure cam (31), the inclined plane of said guiding groove inlet (35a) pushes said sliding bolt (40) into said sliding bolt recess (41), thus compressing said sliding bolt spring (40). When said door (20) is in closed position, said sliding bolt is located in front of a locking cavity (36) into which said sliding bolt spring (42) pushes it. As said locking cavity (36) is fixed, the position of said sliding bolt (40) and therefore of said door (20) is locked independently of the position of said closure cam (31) and therefore of said cam motor (33).

A sliding bolt sensor (38) can be installed in said locking cavity (36). When said sliding bolt (40) enters into said locking cavity (36), the latter is detected by said sliding bolt sensor (38) thus confirming the locked state of said door (20). Said sliding bolt sensor (38) can for example be a Hall-effect sensor, an inductive sensor, an optical barrier, a mechanical switch, or an electric switch. The invention is not however limited to these elements and can use other equivalent means.

In closed position, said door leaf opening stop (22b) and said door leaf closure stop (22c) are positioned on said door leaf anchor (14). In this way, said bottom door leaf (22) cannot be pulled toward the outside or pushed toward the inside. According to a particular embodiment of the invention which comprises a cam striker system (30) at the front of said door (20) and a cam striker system (30) at the rear of said door (20), said door (20) thus has four anchor points preventing it from being opened: said top pivot (23) blocked in translation in said roof (13), said sliding bolt (40) blocked in translation inside said locking cavity (36) at the front of said door (20), said sliding bolt (40) blocked in translation inside said locking cavity (36) at the rear of said door (20), and said bottom door leaf (22) blocked in translation by said door leaf anchor (14).

These four anchor points also prevent said door (20) from being indented inside said vehicle (10), which represents an element of safety in the event of a lateral crash. Said door (20) is preferably substantially dished. Since a lateral crash has the consequence of indenting said door (20), the flattening of its dished form will increase its front-end surface area, provoking a buttressing effect on the edges of said opening (12), preventing said door (20) from passing through said opening (12).

According to an embodiment with a sliding bolt (40) fixed on said door (20), said sliding bolt (40) has a sliding bolt shoulder (40*a*) pressing on said closure cam (31) when said door (20) is in closed or locked position. The press between said closure cam (31) and said sliding bolt shoulder (40*a*) prevents the axial translation of said sliding bolt (40) so that said sliding bolt (40) cannot slide out of said cam striker (30), even when said door (20) is forced and deformed toward the outside of the vehicle. Said sliding bolt shoulder (40*a*) thus enhances the anchoring of said door (20) in said body (11).

To open said door (20), in the embodiment with locking cavity (36), an unlocking cam (32) is mounted on said cam axis (34). Said unlocking cam (32) is provided with an unlocking inclined plane (32*a*). When said cam motor (33) pivots in the reverse direction to that of closure, said unlocking inclined plane (32*a*) pushes said sliding bolt (40) out of said locking cavity (36), compressing said sliding bolt spring (42). Once said sliding bolt (40) is out of said locking cavity (36), said cam motor (33) continues to rotate in the same direction and an opening cavity (31*b*) in said closure cam (31) pushes on said sliding bolt (40) for it to exit from said guiding groove (35). The door is then in semi-closed position.

This action can also be performed manually by actuating a handle (43) which, via a rod system (44), will pull on said sliding bolt (40), compressing said sliding bolt spring (42). Said sliding bolt (40) will thus exit from said cam striker (30). In this case, it is the elasticity of said door seals (18) which, by being decompressed, will push said door (20) to its semi-closed position.

In the case where said cam motor (33) or its transmission system has a non-reversible movement, the unlocking is done in the same movement as the opening: said cam motor (33) pivots in the reverse direction to that of closure, and said opening cavity (31*b*) in said closure cam (31) pushes on said sliding bolt (40) for it to exit from said guiding groove (35). The door is then placed in semi-closed position.

This action can also be performed manually by actuating a handle or a button which, via a transmission system (connecting rods, cables, motor or the like), will uncouple said closure cam (31) from the non-reversible component of said cam motor (33) or its transmission system. Said closure cam (31) being once again free to rotate, said door seals (18) can be decompressed by virtue of their elasticity and bring said door (20) to its semi-closed position.

Once in semi-closed position, at least one or preferably two actuators (15) mounted between said vehicle (10) and said door (20) will push said door (20) to its open position. Said actuators (15) are mounted such that, in closed position of the door, they induce very little torque on said door (20), which makes it possible to place said door (20) in semi-closed position manually without needing any great force, and also makes it possible not to force the closure and locking elements described above. The more said door (20) opens, the more the angle between said actuators (15) and said door (20) increases, which increases the force component which induces the torque, and offsets the loss of linear force of said actuators (15) when they are deployed. The actuators thus always have a force that is sufficient to lift said door (20) to its open position, even when they are at end of travel.

According to a nonlimiting embodiment, said actuators (15) are housed in the thickness of said roof (13) of said body (11). To be able to develop a sufficient force even when said door (20) is close to the semi-closed position, one of the ends of said actuators (15) will be placed as high as possible with respect to the thickness of said roof (13), while the other will be placed as low as possible with respect to the thickness of said roof (13), this being in order to maximize the angle of said actuators (15) with respect to said door (20), and therefore to maximize the force component which induces the torque.

As an example, the curve presented in FIG. 12 shows a system in which said actuators (15) have forces sufficient to open said door (20) when the angle of opening of said door (20) is greater than four degrees. In this example, said cam striker (30) will push said door (20) to an angle of four degrees or slightly more, in order for said actuators (15) to be able to then perform the rest of the opening. The invention is not limited to this particular example. According to other embodiments, the angle will be able to be different from the four degrees mentioned above, or the forces of the actuators may be different from those indicated in FIG. 12.

Said actuator (15) can be, in a nonlimiting manner, a gas spring actuator, a mechanical spring actuator, an electric actuator, a hydraulic actuator or a pneumatic actuator. The invention is not however limited to these elements and can use other equivalent means. According to a nonlimiting embodiment, said actuator (15) can be equipped with a damping system slowing down the opening movement of said door (20) on approaching the open position.

A compensation spring compensating for the weight of said door (20) can also be installed around said top pivot (23), the latter being compressed upon the closure of said door (20), then assisting said actuators (15) to detach said door (20) from said body (11) by a few degrees when said door (20) is in semi-closed position and said actuators (15) have a force that is relatively equivalent to that necessary to open said door (20). This zone of action is represented by way of example in FIG. 12. In this particular example, said compensation spring will apply a force on said door (20) when said door (20) has an angle of opening lying between three and five degrees, which will make it possible to have a clearer opening of said door (20), to have a cam striker (30) that opens said door (20) only to three degrees instead of four degrees, to compensate for the frictions and wear of the system, and/or to compensate for the climatic conditions, said actuators (15) being able, for example, to have forces much lower when the temperature of use is low. Said compensation spring can, in a nonlimiting manner, be a traction, compression or torsion spring, or a torsion bar. The invention is not however limited to these elements and can use other equivalent means.

Assistance can also be provided to facilitate the manual displacement, notably on closure, or even means can be provided to perform an opening and/or closure that is entirely automated, the user simply controlling the movement of the door. According to another, nonlimiting, inexpensive embodiment, said door (20) can operate without any actuator, and all the movements of said door (20) are performed manually by the user.

Upon opening, when said door sensors (37) no longer detect the presence of said detectable elements (25) of said door (20), said cam motor (33) rotates in the direction of opening in order to return said closure cam (31) into a position in which it is ready to perform a new closure. This action is necessary notably in the case where said door (20) has been brought from the closed position to the semi-closed position manually, by the actuation of said handle (43).

According to a nonlimiting embodiment, said opening (12) formed by the door cutting line, and the elements of said door (20) are arranged in such a way that, when said door (20) is in open position, said bottom of the bottom door leaf (22d) is higher than or at the same level as said height of the opening (12a). Thus, when a person wants to enter or exit said vehicle (10), he or she is not hampered by said bottom door leaf (22) and avoids bumping into it.

For these opening, closing, locking and unlocking actions, preferably, the only electrified elements are said cam motor (33) and said door sensor (37). These elements are fixed onto fixed elements of said vehicle (10). Thus, there is no element that requires electricity present in said door (20), making it possible to avoid cost overheads, significant weights and failures. Obviously, another distribution of the elements can be provided.

Since said top pivot (23) is situated high up on said roof (13), it is far from the front and rear crash zones. Thus, in the event of a crash, said top pivots (23) are safeguarded against deformations and retain their functionality even if said body (11) is made of synthetic material. This makes it possible to open said door (20), even after a major crash, thus satisfying the M1 standards on this subject.

Since said body (11) has surfaces with complex geometry, and said bottom door leaf (22) is movable with respect to said top frame (21), the implementation of standard movable windows sliding inside the bottom part of the door is impossible. The movable window (50) of said door (20) according to the invention therefore opens by being detached transversely toward the outside of the interior of said vehicle (10) into a semi-closed position in which the window seals (58) are no longer compressed, then by translating longitudinally toward the rear of said vehicle (10) into an open position. The longitudinal translation of said movable window (50) is facilitated by the fact that, in this position, said window seals (58) are no longer compressed. As said movable window (50) is detached from said door (20) when it translates longitudinally, the risks of scratching said movable window (50), or said door (20), are almost zero. Upon closure, said movable window (50) translates in the reverse direction longitudinally toward the front, then is reattached against said door (20) by compressing said window seals (58).

To realize this kinematic, said door (20) is provided with at least one fixed rail (51) mounted on said top frame (21), and at least one movable rail (52) mounted on said movable window (50). Favorably, to ensure a good stability, the system is provided with two fixed rails (51) and two movable rails (52), one in the top part of said movable window (50), the other in the bottom part of said movable window (50). The use of a fixed rail (51) in association with a movable rail (52) makes it possible to have rails that are twice as short as in a system with a single rail, and for the rails not to be visible when said movable window (50) is in closed position, said movable rail (52) being positioned in front of said fixed rail (51). Said fixed rails (51) and movable rails (52) are preferably made of aluminum, but can also be made of steel or of polymer. They are embedded in the thickness of said top frame (21), set back from the outer surface of said vehicle (10), such that they can be rectilinear and ensure the translation of said movable window (50), even if said body (11) and said movable window (50) have surfaces with complex geometries. According to another embodiment, said fixed rail (51) is positioned on a fixed window of said top frame (21).

On each fixed rail (51) there is mounted a fixed connecting rod (55) pivot-linked therewith. At the other end of said fixed connecting rod (55), a fixed roller (53) is mounted pivot-linked with said fixed connecting rod (55). Said fixed roller (53) is slide-rail-linked with said movable rail (52).

On each movable rail (52) there is mounted a movable connecting rod (56) pivot-linked therewith. At the other end of said movable connecting rod (56), a movable roller (54) is mounted pivot-linked with said movable connecting rod (56). Said movable roller (54) is slide-rail-linked with said fixed rail (51).

The rotation of the pivots of said fixed connecting rods (55) and movable connecting rods (56) makes it possible to detach said movable window (50) from the closed position to the semi-closed position and vice versa. Other equivalent systems are of course possible.

The translation of said fixed rollers (53) and movable rollers (54) respectively in said movable rails (52) and fixed rails (51) allows the translation of said movable window (50) from the semi-closed position to the open position and vice versa.

In closed position, a window locking system (57) blocks the detachment of said movable window (50). According to a nonlimiting embodiment, said window locking system (57) is a three-point toggle lever system operated by the user and accessible only from the inside of the interior of said vehicle (10) in order to prevent opening from the outside and avoid intrusions. Other equivalent systems are of course possible.

In closed position, a fixed slide-rail stop (51a) and a movable slide-rail stop (52a) prevent the translation of said movable window (50) to the rear. In semi-closed position, a fixed opening stop (53a) and a movable opening stop (54a) block the rotation of said fixed connecting rod (55) and said movable connecting rod (56), limiting the detachment of said movable window (50). Between the semi-closed position and the open position, a fixed closure stop (51b) and a movable closure stop (52b) prevent said movable window (50) from being reattached transversely toward the inside of the interior of said vehicle (10). Said fixed opening stop (53a), movable opening stop (54a), fixed closure stop (51b) and movable closure stop (52b) therefore prevent the movement and the excessive vibration of said movable window (50) when the latter is open and said vehicle (10) is travelling.

According to one embodiment, an opening slope (59) can be positioned at the end of said fixed rail (51) and of said movable rail (52) in order to perform the opening of said movable window (50) in a single longitudinal movement: said fixed slide-rail stop (51a) and movable slide-rail stop (52a) have a low height and are followed by said opening slopes (59). When said window locking system is unlocked, the elasticity of said window seal (58) pushes said movable window (50) in transverse translation outward. Thus, the closure stops (51b and 52b) are located facing said opening slopes (59). A longitudinal push on said movable window (50) will place said closure stops (51b and 52b) in contact with said slopes (59), forcing said closure stops (51b and 52b) to translate transversely in order to make the wide longitudinal opening. Thus, the transverse translation and the longitudinal translation are done in a single movement, facilitating the operation for the user.

According to one embodiment, one or more closure springs (60) can be installed between the fixed and movable parts of said movable window (20). That can for example be a torsion spring pressing on said fixed rail (51) and on said fixed connecting rod (55) and another torsion spring pressing on said movable rail (52) and on said movable connecting rod (56), the two springs forcing to press said movable window (50) against said window seal (58). That can likewise be one or more traction springs linking said fixed rail (51) to said movable rail (52). The aim of said closure springs (60) is thus to compress said window seal (58) to obtain the seal-tightness even when said movable window (20) is not locked by said window locking system (57).

A hook (61) can be implemented on said fixed connecting rod (55), said movable rail (52) or an element of the same kinematic group as said movable rail (52) being housed therein when said movable window (50) is in closed position. Said hook (61) thus makes it possible to block the rotation of said fixed connecting rod (55) and the translation of said movable rail (52) when said movable window (50) is in closed position. Said hook represents a second point of locking of said movable window (50) in closed position, in addition to said window locking system (57). The invention is not however limited to these elements and can use other equivalent means.

Said movable rail (52) exits from said hook (61) by a slight transverse movement of said movable rail (52) performed when said movable window (50) switches from the closed position to the semi-closed position. This movement can be performed manually by the user. Advantageously, the interface between said movable connecting rod (56) and said fixed slide-rail stop (51*a*) has an inclined plane. Thus, when said movable window (50) switches between the closed position and the semi-closed position, the slight transverse movement to be released from said hook (61) of said fixed connecting rod (55) is imposed by said inclined plane, said movable connecting rod (56) having to follow the geometries of said fixed slide-rail stop (51*a*) in order to be released therefrom. Advantageously, a tongue (62) mounted on a tongue spring (63) can be implemented between said hook and said movable rail (52) in order to reduce and assist the slight transverse movement, while retaining a good lock in closed position.

To allow an air flow to enter, the kinematic as described allows the person on said rear seat (17) to half-open said movable window (50) by detaching only the rear. It can be reattached from said rear seat (17) or from said front seat (16). This kinematic operates only if the person on said front seat (16) unlocks said window locking system (57).

This movable window system does not need electricity. The fact of eliminating the electric motor allows, by the same token, a lightening, a lower cost and saving on rare earths, and therefore a lesser ecological footprint. Said door (20) is therefore entirely non-electrified and simple to construct. In a variant, it is possible to provide assistance means which partially or totally automate the opening and the closure of the window, the user simply making the command (for example by pressing on a button).

The invention relates also to a vehicle comprising the elements described above alone or in combination, namely at least one such door and/or one such cam striker system and/or one such window.

The embodiments described in the present application are so described as illustrative examples and should not be considered as limiting. Other embodiments can involve means equivalent to those described by way of example. Within the framework of the present invention, embodiments can also be combined with one another depending on the circumstances, or means used in one mode can be used in another mode. Similarly, the dimensions and materials indicated herein are not limited to the illustrative examples but variants using equivalent means, dimensions and materials are possible and can be envisaged.

The invention claimed is:

1. A door system for a vehicle, said door system comprising:
a door comprising
a top pivot,
a top frame linked to the vehicle by the top pivot,
a bottom door leaf, and
at least one bottom pivot between said top frame and said at least one bottom door leaf, said top pivot being farther away horizontally than vertically from said at least one bottom pivot, allowing the door to be opened or closed along the form of a body of the vehicle and allowing said door to have a travel distance exceeding at least the overall width of said vehicle; and
a mobile window,
wherein the door is configured to open or close independently from the position of the mobile window.

2. The door system as claimed in claim 1, wherein the at least one bottom pivot comprises two bottom pivots proximate one another, thereby enabling the two bottom pivots to be disposed on the door that has a significant curvature, said two bottom pivots being disposed proximate the window of the door.

3. The door system as claimed in claim 1, wherein the center of gravity of said bottom door leaf is farther away from a median plane of said vehicle than said at least one bottom pivot, thereby enabling said bottom door leaf to be positioned by gravity to a location of closure of the bottom door leaf, when said door is closed.

4. The door system as claimed in claim 1, further comprising a spring mounted between said bottom door leaf and said top frame, thereby enabling said bottom door leaf to be positioned independently of gravity to a location of closure of the bottom door leaf, when said door is closed, even when said vehicle is located on an inclined plane.

5. The door system as claimed in claim 1, further comprising at least one actuator linking the door to another element of the vehicle, having at least one motorized system pushing said door from a position of total closure to a position of semi-closure, said at least one actuator and said door having a kinematic allowing said actuator to have a force that is sufficient to open the door when the door is in a position lying between the semi-closed position and the open position, resulting in an automatic opening of the door using said at least one motorized system and said at least one actuator,
wherein said at least one actuator is one of a gas spring actuator, a mechanical spring actuator, an electric actuator, a hydraulic actuator, and a pneumatic actuator.

6. The door system as claimed in claim 5, wherein said motorized system is a cam striker enabling said door to be locked in a closed position.

7. The door system as claimed in claim 1, wherein the bottom door leaf is free in rotation around said top frame when said door is not in a closed position, thereby allowing users to enter or exit the vehicle when said door is partially open.

8. The door system as claimed in claim 1, wherein the bottom door leaf has a significant curvature.

9. The door system as claimed in claim 8, wherein the bottom door leaf has a toroidal geometry.

10. The door system as claimed in claim 1, wherein the bottom door leaf has no external asperity.

11. The door system as claimed in claim 1, wherein the bottom door leaf is a closed volume without a motorized element and without a part inside said closed volume.

12. The door system as claimed in claim 6, wherein said cam striker enables switching from an unsealed position of semi-closure of the door with respect to the body to a substantially seal-tight position of complete closure of the door with respect to the body.

13. The door system as claimed in claim 6, wherein said cam striker is mounted outside of said door, the cam strike comprising a closure cam driven in rotation by a motor, and
wherein the door system further comprises at least one sliding bolt, said closure cam being configured to pull on said sliding bolt thus compressing seals of the door and producing complete closure of the door, without any motorized element in said door.

14. The door system as claimed in claim 13, wherein said motor has a mechanically non-reversible movement, producing locking of the door in a position of complete closure with respect to the body.

15. The door system as claimed in claim 14, further comprising an uncoupling system configured to manually uncouple said closure cam from a non-reversible part of said motor, to be able to open said door even in an absence of electricity.

16. The door system as claimed in claim 13, wherein said sliding bolt comprises a shoulder pressing on said closure cam to prevent a forced opening of said door from an inside of the vehicle or from outside of the vehicle.

17. The door system as claimed in claim 13, further comprising a sensor mounted on an element of the vehicle other than said door,
wherein said door further comprises at least one detectable element, a complete closure of said door being triggered only when the sensor detects the detectable element thereby detecting that the door is in a semi-closed position, said cam striker not being accessible for a user in the semi-closed position, thus avoiding a risk of physical accident when the closure cam is actuated, said sensor being one of a Hall-effect sensor, an inductive sensor, an optical barrier, a mechanical switch, and an electrical switch, said detectable element being one of a magnet, a metallic part, an optical reflector, a mechanical stop, and an electrical stop.

18. The door system as claimed in claim 1, wherein a bottom part of said door is configured to be housed in a geometry of said vehicle in a semi-closed position and a closed position, said geometry being undercut with respect to said bottom part, thereby providing an anchoring to prevent a forced opening of said door from an inside of the vehicle or from an outside of the vehicle.

19. The door system as claimed in claim 1, wherein said bottom door leaf is blocked on said vehicle on at least three points including said door leaf anchor, a cam striker disposed on one side of the door, and a cam striker disposed on another side of the door.

20. The door system as claimed in claim 1, further comprising at least one single motor configured to close, open, lock, and unlock the door.

21. The door system as claimed in claim 1, wherein the mobile window is configured to be placed in three distinct positions: a closed position in which the mobile window covers an opening in said door and compresses a seal surrounding said opening, a semi-closed position in which the mobile window is located facing said opening, but not completely compressing said seal, and an open position in which the mobile window is no longer located facing said opening.

22. The door system as claimed in claim 1, said opening being produced in the structure of said door, or in a fixed window mounted on the structure of said door.

23. The door system as claimed in claim 1, wherein said window has a significant curvature.

24. The door system as claimed in claim 1, wherein the door is configured such that the body is without a B-pillar.

* * * * *